United States Patent
Leiber

(10) Patent No.: US 12,409,823 B2
(45) Date of Patent: Sep. 9, 2025

(54) REDUNDANT BRAKE SYSTEM HAVING TWO PRESSURE SUPPLY UNITS FOR ELECTRIC VEHICLES, AND VEHICLES WITH AUTONOMOUS DRIVING OF STEP 3 (HAD) TO STEP 5 (AD)

(71) Applicant: IPGATE AG, Pfäffikon (CH)

(72) Inventor: Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 886 days.

(21) Appl. No.: 17/415,196

(22) PCT Filed: Dec. 20, 2019

(86) PCT No.: PCT/EP2019/086864
§ 371 (c)(1),
(2) Date: Jun. 17, 2021

(87) PCT Pub. No.: WO2020/128078
PCT Pub. Date: Jun. 25, 2020

(65) Prior Publication Data
US 2022/0041150 A1 Feb. 10, 2022

(30) Foreign Application Priority Data

Dec. 20, 2018 (DE) .................... 10 2018 133 189.4
Jul. 10, 2019 (DE) .................... 20 2019 107 191.5
Aug. 30, 2019 (DE) .................... 20 2019 107 193.1

(51) Int. Cl.
*B60T 13/58* (2006.01)
*B60K 1/00* (2006.01)
(Continued)

(52) U.S. Cl.
CPC ............ *B60T 13/586* (2013.01); *B60T 8/94* (2013.01); *B60K 1/00* (2013.01); *B60K 7/0007* (2013.01);
(Continued)

(58) Field of Classification Search
CPC ...... B60T 13/586; B60T 8/94; B60T 2201/16; B60T 2270/402; B60T 2270/403;
(Continued)

(56) References Cited

U.S. PATENT DOCUMENTS 6,318,817 B1 * 11/2001 Martin ................ B60T 13/686
303/116.1
6,508,523 B2 * 1/2003 Yoshino .................... B60L 7/26
903/917
(Continued)

FOREIGN PATENT DOCUMENTS

AT          12010 U2    9/2011
CN       103303292 A    9/2013
(Continued)

OTHER PUBLICATIONS

Office Action issued May 19, 2023 in Chinese Application No. 201980092235.9 (English Translation).
Office Action issued Jul. 29, 2023 in Chinese Application No. 201980092234.4 (English Translation).
Int'l Search Report and Written Opinion issued Feb. 19, 2020 in Int'l Application No. PCT/EP2019/086869, translation of Int'l Search Report only.
(Continued)

*Primary Examiner* — Robert A. Siconolfi
*Assistant Examiner* — James K Hsiao
(74) *Attorney, Agent, or Firm* — Panitch Schwarze Belisario & Nadel LLP

(57) ABSTRACT

A brake system for a vehicle may include at least two hydraulic brake circuits, each having at least one hydraulically acting wheel brake, at least two pressure supply devices, each of which is driven by an electromotive drive, at least one valve assembly having valves for the wheel-individual adjustment of brake pressures and/or for separating the wheel brakes from, or connecting same to, a pressure supply device, at least one electronic control and regulating unit, one of which is a superordinate central control unit that controls individual control and regulating units of the components of the brake system, as well as at least one additional
(Continued)

Figure 1:
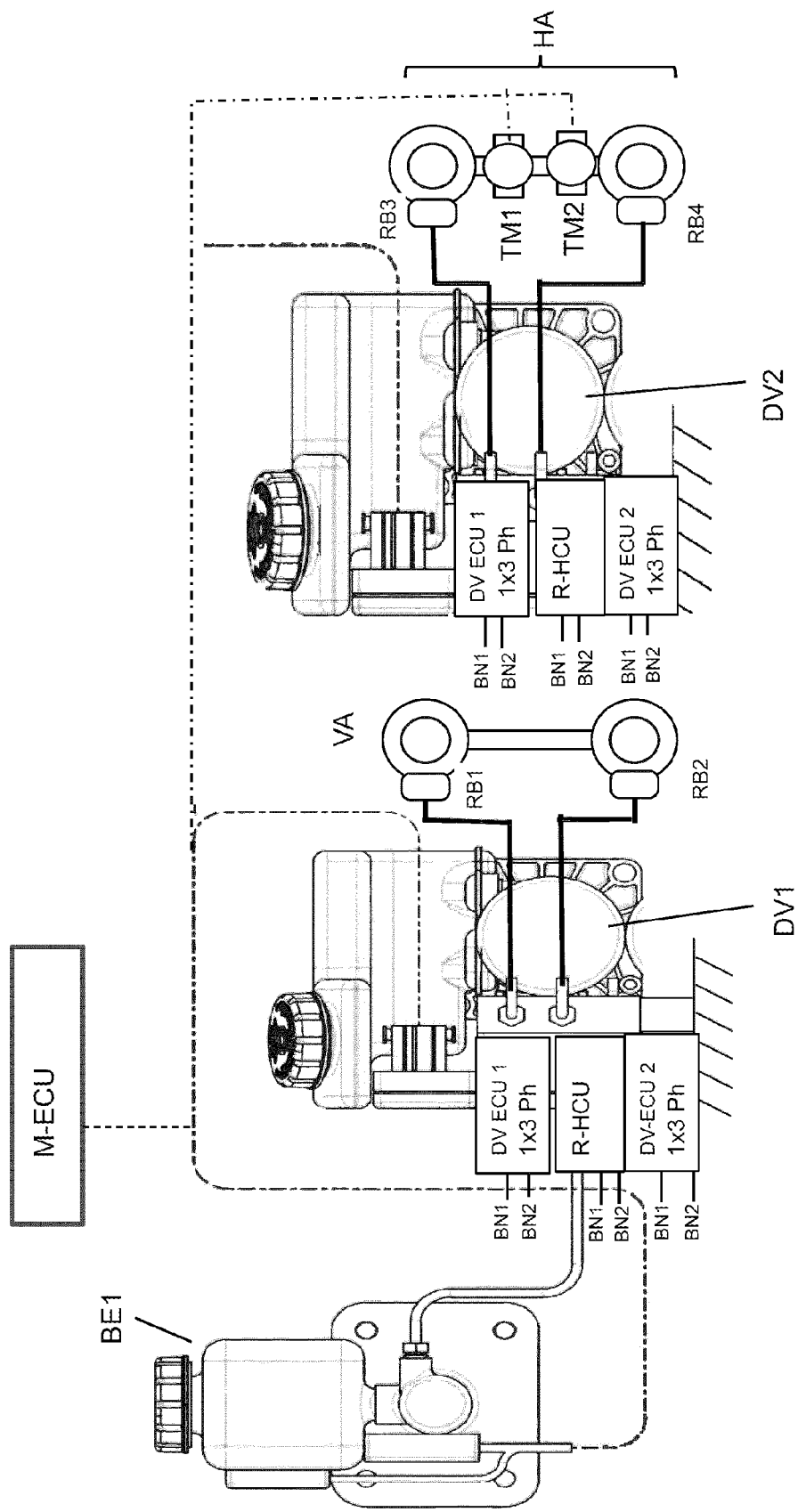

electric drive motor for at least one axle or wheel of the vehicle. The brake system may use the at least one pressure supply device and/or the at least one electric drive motor for controlling pressure in at least one wheel brake for steering interventions.

21 Claims, 23 Drawing Sheets

(51) Int. Cl.
  *B60T 8/94* (2006.01)
  *B60K 7/00* (2006.01)
  *B60L 7/24* (2006.01)

(52) U.S. Cl.
  CPC ............. *B60L 7/24* (2013.01); *B60T 2201/16* (2013.01); *B60T 2270/402* (2013.01); *B60T 2270/403* (2013.01); *B60T 2270/413* (2013.01); *B60T 2270/604* (2013.01)

(58) Field of Classification Search
  CPC ......... B60T 2270/413; B60T 2270/604; B60T 7/12; B60T 13/62; B60T 13/662; B60T 13/745; B60T 7/22; B60T 13/142; B60T 13/70; B60K 1/00; B60K 7/0007; B60L 7/24
  See application file for complete search history.

(56) References Cited

U.S. PATENT DOCUMENTS

| | | | |
|---|---|---|---|
| 7,872,389 B2 | 1/2011 | Leiber | |
| 8,931,856 B2 * | 1/2015 | Okano | B60T 1/10 303/3 |
| 9,145,119 B2 * | 9/2015 | Biller | B60T 8/17 |
| 9,205,824 B2 * | 12/2015 | Feigel | B60T 13/686 |
| 9,296,370 B2 * | 3/2016 | McClain | B60T 7/042 |
| 9,415,758 B2 * | 8/2016 | Drumm | B60T 13/686 |
| 10,137,877 B2 * | 11/2018 | Feigel | B60T 8/4081 |
| 10,358,119 B2 * | 7/2019 | Besier | B60T 13/142 |
| 10,821,949 B2 * | 11/2020 | Henriques | B60T 7/042 |
| 11,648,924 B2 * | 5/2023 | Maj | B60T 8/326 303/6.01 |
| 2003/0038541 A1 * | 2/2003 | Suzuki | B60T 7/042 303/146 |
| 2004/0090115 A1 * | 5/2004 | Inoue | B60T 8/368 303/DIG. 10 |
| 2005/0159871 A1 | 7/2005 | Nakamura et al. | |
| 2007/0241611 A1 * | 10/2007 | Shimada | B60K 6/44 303/155 |
| 2008/0093179 A1 * | 4/2008 | Jager | B60W 10/184 701/22 |
| 2008/0197738 A1 | 8/2008 | Leiber et al. | |
| 2009/0115247 A1 | 5/2009 | Leiber et al. | |
| 2010/0198475 A1 | 8/2010 | Stolzl et al. | |
| 2010/0206673 A1 * | 8/2010 | Hitzel | B60T 8/267 188/106 R |
| 2010/0270854 A1 * | 10/2010 | Okano | B60T 8/4081 303/3 |
| 2010/0282549 A1 * | 11/2010 | Feigel | B60T 8/4072 188/110 |
| 2011/0024249 A1 * | 2/2011 | Nishikawa | B60T 8/261 701/70 |
| 2011/0115282 A1 * | 5/2011 | Dinkel | B60T 13/143 303/3 |
| 2011/0241417 A1 * | 10/2011 | Miyazaki | B60T 13/166 303/2 |
| 2012/0013173 A1 | 1/2012 | Leiber et al. | |
| 2012/0018262 A1 | 1/2012 | Winkler | |
| 2012/0030581 A1 | 2/2012 | Cui et al. | |
| 2012/0130581 A1 | 5/2012 | Semsey et al. | |
| 2012/0212044 A1 * | 8/2012 | Nakamura | B60L 7/18 303/9.62 |
| 2013/0062932 A1 * | 3/2013 | Yagashira | B60L 7/14 303/3 |
| 2013/0127236 A1 * | 5/2013 | Hakiai | B60T 17/04 303/3 |
| 2013/0181506 A1 * | 7/2013 | Weiberle | B60T 7/06 303/2 |
| 2013/0204502 A1 | 8/2013 | Biller et al. | |
| 2014/0095042 A1 | 4/2014 | Sakashita et al. | |
| 2014/0152085 A1 * | 6/2014 | Biller | B60T 13/58 303/14 |
| 2014/0203626 A1 * | 7/2014 | Biller | B60T 7/02 303/14 |
| 2014/0216866 A1 | 8/2014 | Feigel et al. | |
| 2015/0151726 A1 * | 6/2015 | McClain | B60T 8/92 303/15 |
| 2015/0266457 A1 | 9/2015 | Johnson et al. | |
| 2016/0009263 A1 | 1/2016 | Feigel et al. | |
| 2016/0009267 A1 * | 1/2016 | Lesinski, Jr. | B60T 7/12 303/10 |
| 2016/0023644 A1 * | 1/2016 | Feigel | B60T 8/4081 303/3 |
| 2016/0159225 A1 * | 6/2016 | Nakatsu | B60L 15/2009 701/70 |
| 2016/0167632 A1 * | 6/2016 | Deng | B60T 8/4086 701/70 |
| 2016/0264113 A1 | 9/2016 | Feigel | |
| 2016/0347298 A1 * | 12/2016 | Jung | B60T 13/166 |
| 2016/0355171 A1 | 12/2016 | Mannherz et al. | |
| 2017/0072920 A1 * | 3/2017 | Besier | B60T 8/4081 |
| 2017/0246957 A1 | 8/2017 | Ienaga et al. | |
| 2017/0274884 A1 * | 9/2017 | Besier | B60T 13/686 |
| 2017/0282877 A1 * | 10/2017 | Besier | B60T 8/885 |
| 2017/0361825 A1 * | 12/2017 | Drumm | B60T 8/4081 |
| 2018/0126971 A1 * | 5/2018 | Leiber | B60T 13/741 |
| 2018/0162332 A1 * | 6/2018 | Nakazawa | B60T 7/22 |
| 2019/0016321 A1 | 1/2019 | Dinkel | |
| 2019/0039579 A1 * | 2/2019 | Ohkubo | B60T 13/586 |
| 2019/0308601 A1 * | 10/2019 | Maj | B60T 13/161 |
| 2019/0344767 A1 * | 11/2019 | Bareiss | B60T 7/12 |
| 2019/0344769 A1 * | 11/2019 | Zimmermann | B60T 8/326 |
| 2020/0139949 A1 | 5/2020 | Dolmaya et al. | |
| 2020/0171956 A1 | 6/2020 | Park | |
| 2020/0262399 A1 | 8/2020 | Yokoyama et al. | |
| 2020/0361439 A1 | 11/2020 | Neu et al. | |
| 2021/0070267 A1 * | 3/2021 | Weh | B60T 8/4081 |
| 2021/0245757 A1 | 8/2021 | Imamura et al. | |
| 2022/0063600 A1 | 3/2022 | Inoue | |
| 2022/0289161 A1 | 9/2022 | Leiber | |
| 2024/0017725 A1 | 1/2024 | Miyake et al. | |
| 2024/0100957 A1 * | 3/2024 | Andreasson | B60L 7/18 |

FOREIGN PATENT DOCUMENTS

| | | |
|---|---|---|
| CN | 104203665 A | 12/2014 |
| CN | 105026232 A | 11/2015 |
| CN | 105683008 A | 6/2016 |
| CN | 108025714 A | 5/2018 |
| DE | 4335769 C1 | 12/1994 |
| DE | 4413579 A1 | 10/1995 |
| DE | 102007015809 A1 | 10/2008 |
| DE | 102008051350 A1 | 4/2009 |
| DE | 102010038555 A1 | 2/2012 |
| DE | 102011084206 A1 | 4/2012 |
| DE | 102013224313 A1 | 9/2014 |
| DE | 102013217954 A1 | 3/2015 |
| DE | 102013224776 A1 | 6/2015 |
| DE | 102015206572 A1 | 11/2015 |
| DE | 202015008975 U1 | 6/2016 |
| DE | 202015008976 U1 | 7/2016 |
| DE | 102015103858 A1 | 9/2016 |
| DE | 102015210433 A1 | 12/2016 |
| DE | 112009005541 B3 | 8/2017 |
| DE | 102016203563 A1 | 9/2017 |
| DE | 102016213994 A1 | 2/2018 |
| DE | 102016225537 A1 | 6/2018 |
| DE | 102017222450 A1 | 7/2018 |

(56) References Cited

FOREIGN PATENT DOCUMENTS

| | | |
|---|---|---|
| DE | 102005055751 B4 | 9/2018 |
| DE | 102017204157 A1 | 9/2018 |
| DE | 102005018649 B4 | 10/2018 |
| DE | 102017003654 A1 | 10/2018 |
| DE | 102017111077 A1 | 11/2018 |
| DE | 102017207954 A1 | 11/2018 |
| DE | 102017114556 A1 | 1/2019 |
| DE | 102018202885 A1 | 8/2019 |
| EP | 1874602 B1 | 12/2012 |
| EP | 1759447 B1 | 7/2013 |
| EP | 2396202 B1 | 4/2015 |
| EP | 3208162 A1 | 8/2017 |
| EP | 3271221 A2 | 1/2018 |
| JP | 2013010469 A | 1/2013 |
| WO | 2006111392 A1 | 10/2006 |
| WO | 2012049134 A1 | 4/2012 |
| WO | 2012059175 A1 | 5/2012 |
| WO | 2013140221 A1 | 9/2013 |
| WO | 2015032637 A1 | 3/2015 |
| WO | 2016146223 A2 | 9/2016 |
| WO | 2017058707 A1 | 4/2017 |
| WO | 2018130481 A1 | 7/2018 |

OTHER PUBLICATIONS

Int'l Search Report and Written Opinion issued Jun. 29, 2020 in Int'l Application No. PCT/EP2019/086864, translation of Int'l Search Report only.
Search Report issued Oct. 2, 2019 in DE Application No. 10 2018 133 189.4.
Search Report issued Oct. 2, 2019 in DE Application No. 10 2018 133 218.1.
Office Action issued Feb. 17, 2023 in Chinese Application No. 201980092234.4.
Extended European Search Report issued Jun. 13, 2023 in EP 23161067.6.
Office Action issued Jun. 6, 2024 in U.S. Appl. No. 17/415,246.
Office Action issued Jul. 3, 2024 in U.S. Appl. No. 18/666,153.
Office Action issued Nov. 5, 2024, in U.S. Appl. No. 18/666,153.
Office Action issued Dec. 2, 2024 in U.S. Appl. No. 17/415,246.
Extended European Search Report issued on Jan. 16, 2025, in EP Application No. 24189574.7.
Office Action issued Apr. 10, 2025, in U.S. Appl. No. 17/415,246, by Lieber.

* cited by examiner

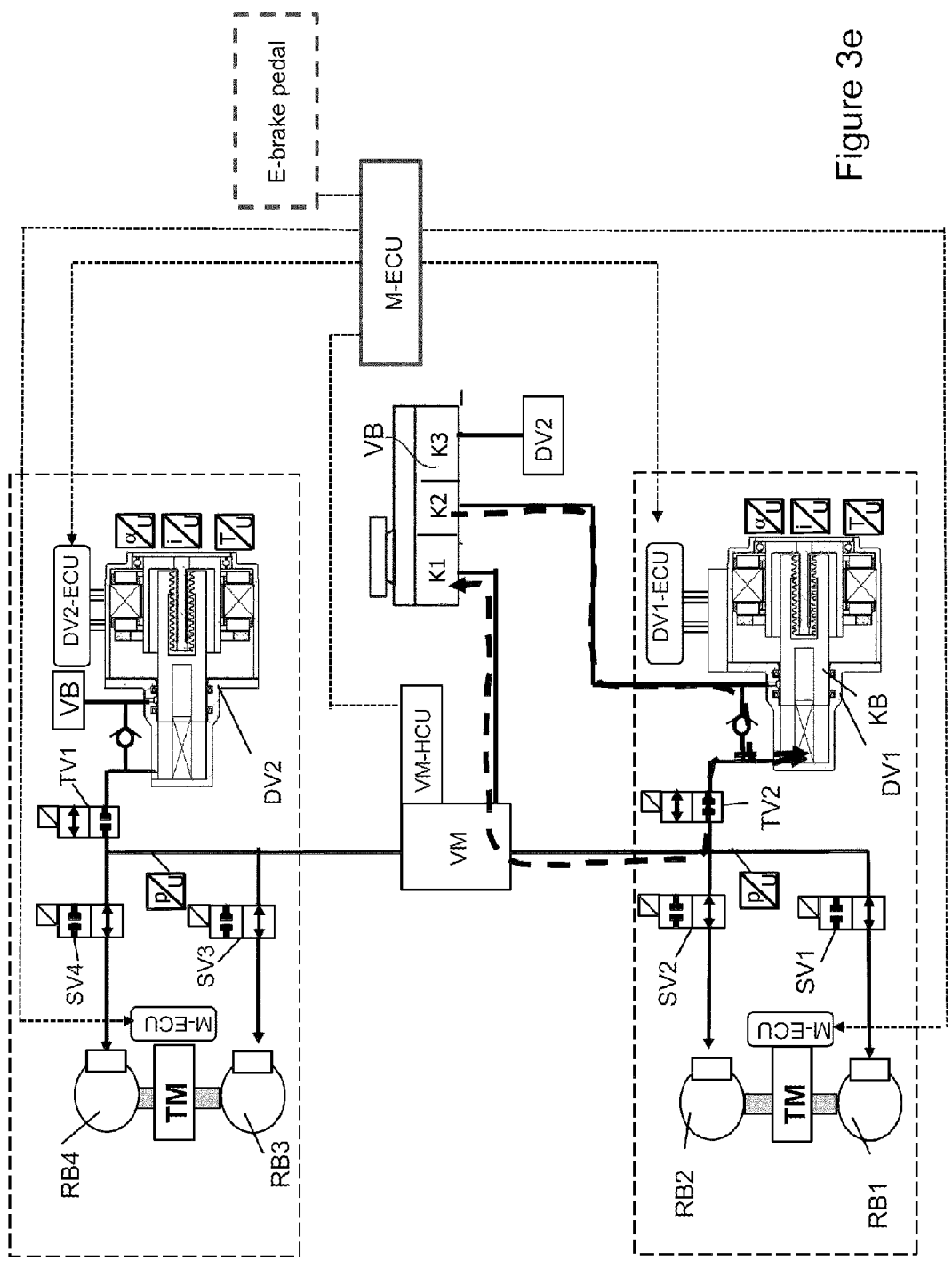

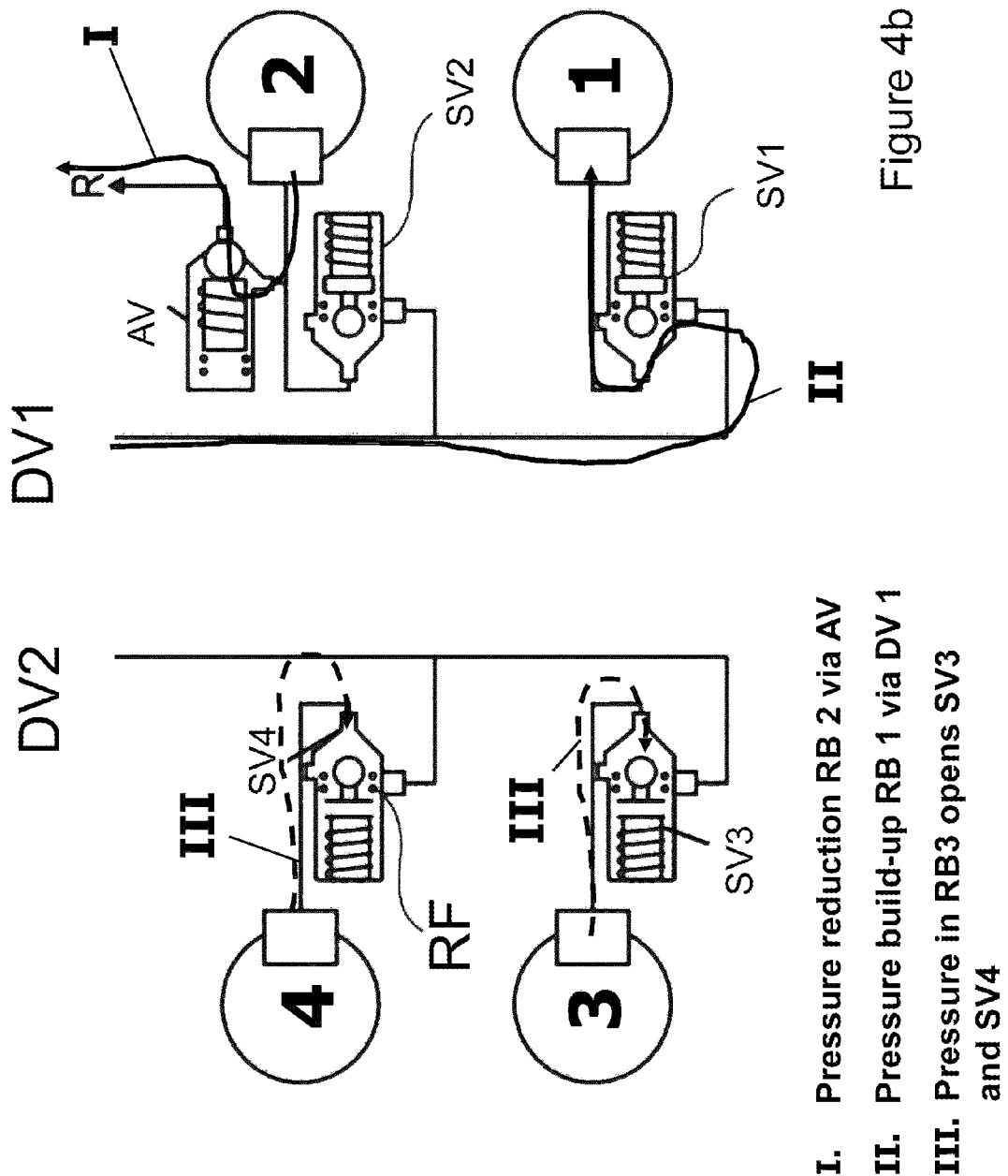

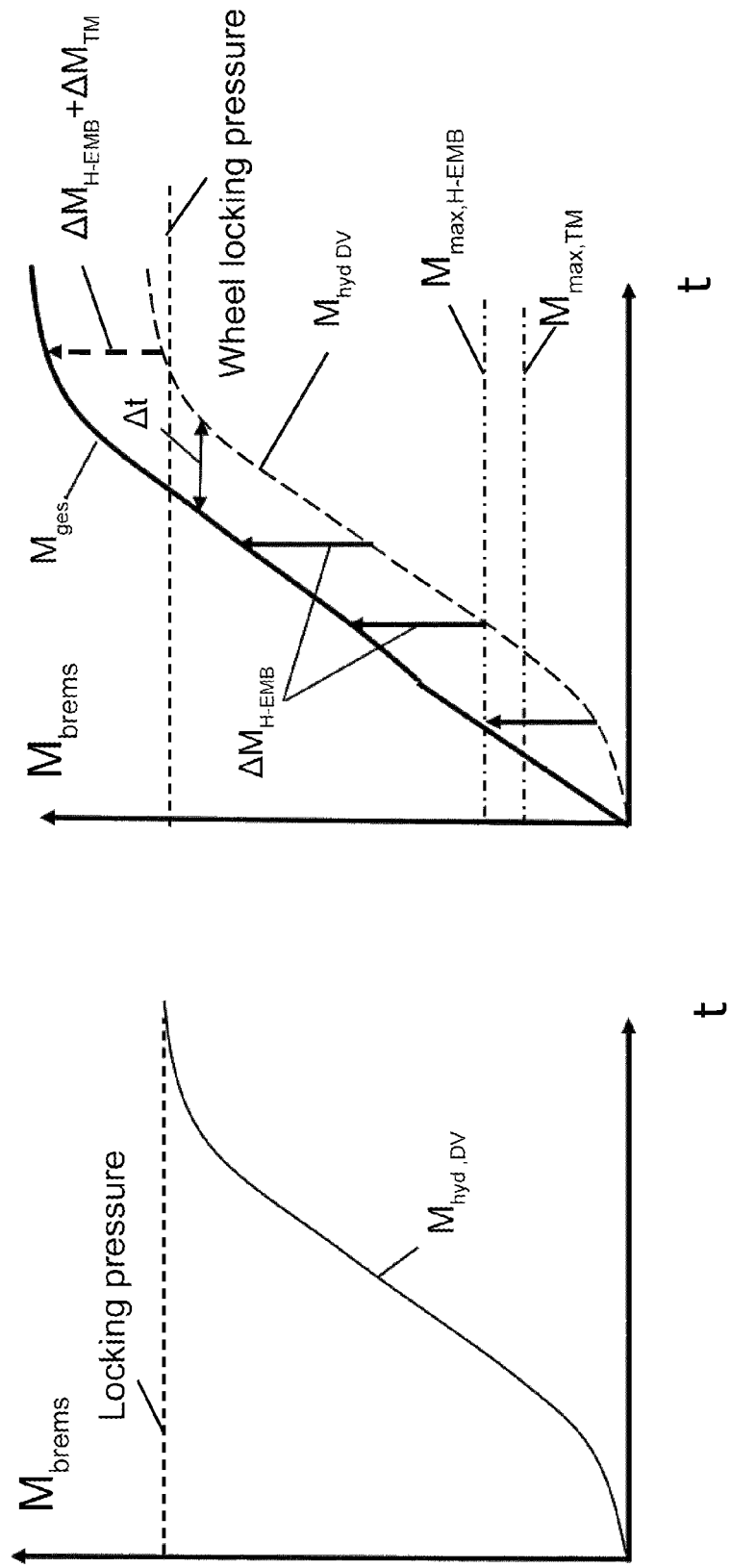

| Operating state | Pressure supply and control valves | AV for pressure reduction | Actuating unit (BE) | Drive motor vehicle (TM) | H-EMB/EPB EPS (steering) |
|---|---|---|---|---|---|
| Normal state | MUX operation in the predominantly closed brake circuit with max. torque for max. pressure (e.g., 140—200 bar) | Use of AV in special situations high-m ABS (pressure reduction via AV), i.e., the brake circuit is very rarely opened and is closed 90-99% of the time | Pedal feel unchanged | Maximum recuperation of kinetic energy (pressure curve of the DV is ideally matched to the torque and braking power of the TM depending on the required braking power) | Is only used for parking function when the vehicle is stationary |
| F1: Failure 1x 3 phases of DV2 or DV1 | MUX operation with half torque. Pressure, for example 70-100 bar up to approximately wheel-locking pressure | Use of AV to improve the control dynamics of MUX operation (pressure reduction via AV) | Pedal feel unchanged | | • Optional support in increasing the braking torque<br>• If necessary, intervention in wheel-specific control (stabilization/steering) |
| F2_Failure DV1 (VA) | No function on VA, disconnect pressure supply DV via separating valves TV | No function | Pressure build-up on the front axle through actuating unit (0.4-0.6 g) | • Support for greater decelerations up to 0.9 g on VA, partial deceleration on HA<br>• Axle-based control | • Optional support in increasing the braking torque<br>• If necessary, intervention in wheel-specific control (stabilization/steering) |
| F3. Failure DV2 (HA) | No function on HA | | Pedal feel unchanged | • Braking via TM | • H-EMB takes over wheel-specific control/ deceleration on HA |
| F4:_Complete failure DV1 and D2 | No control | | Pressure build-up on the front axle through actuating unit (0.4-0.6 g) | Support for greater decelerations up to 0.9 g on VA, partial deceleration on HA | • HA deceleration by the motor of the H-EMB<br>• Use of H-EMB and EPS for stability (steering/ torque vectoring) |

FIG. 8

| Operating state | Pressure supply and control valves | AV for pressure reduction | Operating state VM | Drive motor vehicle (TM) | H-EMB/EPB EPS (steering) |
|---|---|---|---|---|---|
| Normal | MUX operation in the predominantly closed brake circuit with max. torque for max. pressure (e.g., 160-200 bar) | Use of AV in special situations high-m ABS (pressure reduction via AV), i.e., the brake circuit is very rarely opened and is closed 90-99% of the time | Closed | Maximum recuperation of kinetic energy (pressure curve of the DV is ideally matched to the torque and braking power of the TM depending on the required braking power) | Is preferably only used for parking function when the vehicle is stationary |
| F1: Failure 1x 3 phases of DV2 or DV1 | MUX operation up to half the torque/pressure (e.g., 100 bar) on the respective axle | Use of AV to improve the control dynamics of MUX operation (pressure reduction via AV) | Closed | | • Optional support in increasing the braking torque<br>• If necessary, intervention in wheel-specific control (stabilization/steering) |
| F2_Failure DV1 (VA) | • No function on VA, disconnect DV via TV<br>• DV2 takes over control of the 4-wheel vehicles in MUX operation with AV | Active DV takes over the wheel-specific control:<br>Use of AV for control for dynamic situations (rapid pressure reduction at high-µ), approx. 10-20% of the time | Connection of the brake circuits via VM | • Front axle VA deceleration | • H-EMB/EPB support in increasing the braking torque<br>• H-EMB/EPB: If necessary, intervention in wheel-specific control (stabilization/steering)<br>• EPS takes over the driving dynamics function on the front axle |
| F3: Failure DV2 (HA) | • No function on HA, disconnect DV via TV<br>• Bypass: DV1 takes over control of the 4-wheel vehicles in MUX operation with AV | | Connection of the brake circuits via VM | • Rear axle HA deceleration | |
| F4: Complete failure DV1 and D2 | No control | | | • Emergency deceleration via TM | • Emergency deceleration/stabilization via EPB, H-EMB/EPS |

FIG. 9

REDUNDANT BRAKE SYSTEM HAVING TWO PRESSURE SUPPLY UNITS FOR ELECTRIC VEHICLES, AND VEHICLES WITH AUTONOMOUS DRIVING OF STEP 3 (HAD) TO STEP 5 (AD)

CROSS-REFERENCE TO RELATED APPLICATION

This application is a Section 371 of International Application No. PCT/EP2019/086864, filed Dec. 20, 2019, which was published in the German language on Jun. 25, 2020 under International Publication No. WO 2020/128078 A2, which claims priority under 35 U.S.C. § 119(b) to German Patent Application No. 10 2018 133 189.4, filed Dec. 20, 2018, German Patent Application No. 20 2019 107 191.5, filed Jul. 10, 2019, and German Patent Application No. 20 2019 107 193.1, filed Aug. 30, 2019, the disclosures of which are incorporated herein by reference.

DESCRIPTION

The present invention relates to a device for a hydraulic actuation system for a brake for electric vehicles and in particular vehicles with highly automated driving, fully automated driving or autonomous driving

Prior Art

The automotive industry is undergoing a disruptive change process. In addition to the increasing market penetration of electric vehicles, various stages of automated driving are being passed through, these are initially: Level 3—highly automated driving—HAD, level 4—fully automated driving—FAD, and level 5—autonomous driving—AD with each level increasing the demands on the braking systems used. This has driven the development of new braking systems forward. The replacement of vacuum brake boosters with electric brake boosters (e-BKV) began in 2005 after initial approaches [ATZ edition 6/11] with the market launch of what are termed 2-box solutions with electrical slave brake boosters and an additional ESP unit in 2013 [ATZ edition 4/18] followed shortly by the first integrated 1-box systems with pedal simulators in 2017 [Bremsenhandbuch—Chapter 20]. Solutions for level 3 (HAD) are currently being developed.

From level 3 (HAD), a redundant pressure supply is mandatory for the first time. In addition, a connection between the brake circuits and the reservoir should be avoided as far as possible in the case of open braking systems and pedal feel simulators with constant pedal characteristics should be used. A redundancy of the ABS function must also be provided. This is implemented in what are termed 2-box systems with electric brake boosters and ESP/ABS unit according to the prior art according to DE112009005541B3 in such a way that the electric brake booster (e-BKV) takes over a pressure modulation function in the event of failure of the ESP unit in order to always ensure high vehicle deceleration. In the first step, what is termed an "ABS select-low control" was introduced.

From level 4 (FAD), 3-fold redundancies are expected for sufficient system availability, e.g., with the pedal sensors with the rule "2 out of 3". In addition, a pedal simulator is essential because of the increasing recuperation performance of electric vehicles and a lack of acceptance of changes in the pedal characteristics because fully automatic driving (FAD) can be operated over a longer period of time and the vehicle driver is not prepared for a change in the pedal characteristics when switching to piloted driving. To monitor the pressure supply, a redundant pressure transducer must be provided or an alternative diagnostic option must be provided. A redundant ABS function with at least individual axle control will also be required and partial redundancies will be introduced. Braking systems with closed brake circuits in ABS operation have safety advantages.

In level 5 (AD), the pedal position sensor and pedal simulator and their characteristics are no longer relevant. In contrast, the remaining components and subsystems will have triple redundancy, with the rule "2 out of 3" for sensors, control and regulating units ECU and part-ECU, or multiple redundancy. In addition, complete redundancy must be provided for the wheel-specific control.

Several new vehicle manufacturers such as Apple, Uber and Waymo are working on completely autonomous vehicles without a vehicle driver, which in the first expansion stage have a brake pedal with a simple pedal feel simulator unit (level 4 FAD) and in the last expansion stage (level 5 AD) should no longer have a brake pedal. In addition, vehicles with powerful electric drive motors on both the rear and front axles are becoming increasingly popular.

In addition to the electrohydraulic braking systems described, the electromechanical brake (EMB, electromechanical wedge brake) is a known solution. The EMB has not caught on in the past due to safety concerns and high costs. The high costs are due in particular to the fact that an electric motor and a complex electromechanical mechanism are required for each wheel brake. In addition, an EMB has a large number of electrical contact points, which are known to be more prone to faults than hydraulic lines.

For reasons of cost and reliability, braking systems for the FAD and AD levels cannot exclusively have EMB or wedge brakes. An EMB is only suitable for the rear axle of a vehicle because the rear axle has a smaller share of the braking force and a failure is not viewed as critically as on the front axle. A hydraulic braking system with control in the predominantly closed brake circuit via an electrically driven piston-cylinder unit is thus preferred.

In DE102005055751B4 and DE102005018649B4, the high-precision piston pressure control (PPC) is implemented by means of an electrically driven piston-cylinder unit having a spindle drive. The pressure is controlled using a non-linear map, what is termed the pressure-volume characteristic, in which the relationship between pressure and piston position is evaluated. Alternatively or additionally, the pressure is used by phase current control of the electric motor, the physical relationship of proportionality between current to torque and, due to a known piston area and fixed gear ratio, proportionality between current and pressure also existing and being used. With these two parameters, the pressure and the pressure change curve can be controlled very precisely.

In EP1874602B1 and EP2396202B1 what is termed the multiplex method (MUX) is described, which is particularly suitable for the requirements of levels 4 and 5 since a closed braking system, as explained later, does not have any dormant faults. In addition, a plurality of wheel brakes can be pressurized and depressurized with only one switching valve each, either simultaneously or one after the other. The high dynamic demands on the electric motor are disadvantageous, in particular if all wheel brakes are controlled by one motor. This requires a special motor with a double air gap such as is known from EP 1759447B1 or a motor with a very low inertia mass.

In WO201614622A2 a special valve circuit of switching valves is also implemented, where the interior of the switching valve is connected to the associated brake circuit via a hydraulic line and the valve seat compensation is connected to the associated wheel brake via a hydraulic line. This valve switching is particularly suitable for the MUX method with only one switching valve per brake circuit, since in the event of a fault the solenoid valve opens due to the pressure in the wheel brake and thus prevents the pressure from remaining locked in the wheel brake, which leads to undesired vehicle deceleration.

A further developed MUX method (MUX 2.0) with only one outlet valve per brake circuit is known from EP3271221A2. This means that the dynamic requirements for multiplex operation can be significantly reduced because pressure can also be reduced via outlet valves in situations with extremely high pressure change dynamic requirements and the braking system is operated in a closed brake circuit during normal operation. As a result, the dynamic demands on the electric motor can be significantly reduced or very good regulation can be achieved using the multiplex method.

An advantageous actuating unit (BE) with two path sensors and an elastic element acting therebetween is known from WO2012059175A1, with which differential paths and/or differential forces are measured and used by the control of the braking system. A braking system with such an actuating unit, supplemented by a pedal feel simulator, requires requirements for multiple redundancies of level 3 to level 5.

Certain components of braking systems are to be regarded as critical to safety. These are seals for pistons, solenoid valves and ball screw drives. Various faults and their effects are listed below:
  Piston: Piston seals can fail, although the leakage may not occur at low pressures, for example, but only at high pressures. Leakage leads to a failure of the piston function. Pistons are used in path simulators, pressure supplies and master brake cylinders (HZ) and can lead to pedal failure or failure of the pressure supply.
  Solenoid valves: Dirt particles can settle in the valve seat. If solenoid valves in an open braking system are connected to the reservoir, for example, particles can settle when they close and the connection is not tight. The tightness cannot be diagnosed when open.
  Ball screw drive: Ball screw drives wear out over their service life and can jam, in particular if dirt particles get into the ball screw drive. This can lead to failure of the pressure supply.

The requirements for level 3 (HAD), level 4 (FAD) and level 5 (AD) braking systems and for e-vehicles that have increasingly powerful electric drive motors on one or more axles can be summarized as follows:
  completely noiseless operation, i.e., no disturbing noises from units on the bulkhead;
  even shorter construction than conventional cars due to new vehicle platform concepts for electric vehicles;
  brake intervention for individual wheels or axles, even in the event of complete or partial failure of modules;
  functional scope ABS, ESP, ASR, recuperation and torque vectoring with the least possible restriction of performance even in the event of complete or partial failure of modules;
  maximum recuperation of the vehicle's kinetic energy through maximum utilization of the braking power by electric motors; therefore dynamic and precise control of the hydraulic braking system as required;
  use of available braking torques, e.g., from drive motors to simplify the braking systems or shorten the braking distance;
  increased safety through redundancy of the systems, signal transmission and power supply;
  diagnostic methods for detecting leaks or avoiding dormant faults;
  high demands on the control accuracy for further braking distance reduction, in particular when electric drive motors and hydraulic braking torques work together;
  high modularity of the systems, i.e., the use of the same parts/modules, in particular for the pressure supply; modularity is driven by a large number of vehicle drive concepts, in particular in the coexistence of vehicles with internal combustion engines, hybrid vehicles and pure electric vehicles (internal combustion engines, hybrid engines, pure electric vehicles, driverless vehicles).

OBJECT OF THE INVENTION

The object of the present invention is to provide a braking system that meets the requirements of high availability in fully automated driving (FAD) and autonomous driving (AD) and is also suitable for electric vehicles.

Achieving the Object

The object of the invention is achieved by a braking system having the features of claim 1. Advantageous designs of the braking system according to claim 1 result from the features of the dependent claims.

The invention is advantageously characterized in that redundancy requirements of fully automated driving (FAD) and autonomous driving (AD) are met and, at the same time, high synergy effects are used in the interaction of the braking system with electric drive motors of electric vehicles. For example, the energy recovery of kinetic energy by the electric motor is not restricted by the braking system, as for example in the case with slave brake boosters without path simulator according to DE 11 2009 005 541 B3. The braking system according to the invention is advantageously equipped for FAD with an actuating unit (BE) with a pedal feel simulator. However, it is also possible to implement the braking system according to the invention for AD without an actuating unit (BE), the braking system then being controlled by a superordinate control.

In the embodiment for level 4 (FAD), an actuating unit with corresponding redundancies must be provided for autonomous driving. The actuating unit optionally has a hydraulic connection to at least one brake circuit or is used as a pure pedal feel simulator without a connection to the hydraulics of the braking system, the actuation force then being transmitted purely electrically. An electric brake pedal (e-brake pedal) can be designed hydraulically or electromechanically.

In the embodiment for autonomous driving (AD), no actuating unit is provided, a central control and regulating unit (M-ECU) taking over the communication with the actuating units.

For the wheel-specific redundant brake control, the invention provides in a basic embodiment that either
  at least one pressure supply device has two independent electronic control and regulating units or a double redundant control and regulating unit for controlling its electric-motor drive, and/or each pressure supply device in each case is assigned to a brake circuit for the regular operation of the braking system, and that a connection module is provided for the optional connection of the brake circuits, such that if one pressure supply device fails, the pressure supply or pressure control for both brake circuits is carried out by the other still functional pressure supply device.

This formation provides a double redundancy at least for the pressure supply and its control.

In an additional development of the basic embodiment according to the invention for providing an additional redundancy, it is provided that at least one, in particular each, electronic control and regulating unit controls separate windings of the or an electric-motor drive. This advantageously ensures that if a winding system fails, the drive motor can still be operated with at least half the maximum torque.

The embodiments described above can also be made more reliable if either one, in particular redundant, valve assembly is assigned to each pressure supply device, or one redundant valve assembly is assigned to two pressure supply devices. The invention understands a redundant valve assembly to be designed in such a way that if one or both control and regulating units of the pressure supply device fail, the solenoid valves of the pressure supply can still be operated safely.

In a further embodiment, the pressure supply device, together with the valve assembly and the at least one electronic control and regulating unit assigned to the pressure supply device, can be combined to form a module or assembly. This results in a compact and inexpensive unit which can be accommodated and installed in the vehicle in a space-saving and simple manner.

If an actuating device is provided, in particular in the form of a brake pedal, it is advantageous if this acts on a piston-cylinder unit and adjusts its piston so that, in the event of a fault, a brake pressure can be built up with the actuating device in at least one brake circuit via a hydraulic connection. A simple master brake cylinder or a tandem master cylinder, optionally with redundant seals, and an absolutely necessary path simulator can be provided here.

The braking systems described above advantageously regulate in control operation with a closed brake circuit, i.e., in control operation there is no pressure reduction via solenoid valves in the reservoir, and/or the pressure in the wheel brakes of the respective brake circuit is controlled or set using the multiplex method and/or simultaneously. To be on the safe side, the switching valves should be connected to the wheel brakes in such a way that they open automatically due to pressure in the wheel brake. This advantageously ensures that the brake pressure in the wheel brakes can be reduced in any case and undesired braking or locking of the wheels does not occur.

It is also advantageous if, in the braking systems described above, a pressure reduction in control operation takes place, especially with very high pressure dynamics requirements, e.g., with high-μABS control, in particular in the event of failure of a pressure supply device and/or an control and regulating device of a pressure supply in a wheel brake via the opening of an outlet valve in the reservoir, in particular in extended multiplex operation (what is termed the MUX 2.0 method), in which a pressure supply device for all wheel brakes takes over the pressure control.

In an additional very advantageous design of the braking systems described above, at least one wheel brake, preferably two wheel brakes, is/are a hydraulically supported electromechanical brake (H-EMB), an electric parking brake (EPB) or an electromechanical brake (EMB). Similarly, in addition to a conventional hydraulic wheel brake, an electric motor of an additional electric parking brake or an electromechanical brake can have a braking effect on the wheel. This measure creates an additional redundancy. When a hydraulically supported electromechanical brake is provided, a braking force can advantageously be built up with this both hydraulically and electromechanically.

If no actuating device and/or a traction motor for a wheel or an axle is provided in one of the braking systems, the braking system, in particular the electronic control and regulating units of the pressure supply devices, should be controlled by a superordinate central control unit. The superordinate control unit can thus control the pressure supply devices, valves, electric drive motors and/or EMB or H-EMB during the braking process and/or ABS control operation and/or to diagnose the braking system and, in addition to the brake, can also control other vehicle dynamics functions, (e.g., steering, damping, roll stabilization), in a useful manner.

If at least one electric drive or traction motor is provided for at least one axle or wheel of the vehicle, this can also be used advantageously for braking an axle or a wheel. This provides an additional redundancy. In control operation or if a component of the braking system, for example a pressure supply device, fails, a (supporting) braking force can also be produced by means of the traction motor(s). Through a combined use of the pressure supply device, hydraulically supported electromechanical brake(s) H-EMB, electric parking brake(s) EPB and/or electromechanical brake(s) EMB and/or one or a plurality of drive motors(s), a faster increase in braking force with a shorter time-to-lock (TTL) or a higher braking torque can advantageously take place in control operation or in the event of failure of one or a plurality of components of the braking system.

In the braking systems described above, each pressure supply device can advantageously be preceded by at least one separating valve at the outlet of the pressure supply, with the respective pressure supply device being able to be disconnected from the respective brake circuit by closing the separating valve, in particular if it fails.

In order to make the braking system according to the invention even more secure against failure, at least one control and regulating device of a pressure supply and valve assembly can have a separate voltage supply and, in particular, signal transmission, in particular all modules of a pressure supply device can be supplied by at least two vehicle electrical systems and/or have redundant signal transmissions. In the context of the invention, two vehicle electrical systems are understood to mean that either different voltage levels and/or voltage sources are used to supply the braking system.

It is also advantageous if, in the aforementioned possible embodiments of the braking system according to the invention, either the pressure control in a brake circuit is carried out using at least one pressure sensor and/or via the current measurement of the motor current of the drive and path control of the piston of the pressure supply device, which can be further refined in the pressure control quality by taking into account the temperature of the drive. This enables precise pressure control even without a pressure sensor, as has already been explained in detail in DE102005055751B4 by the applicant in function without a temperature sensor.

In order to enable safe separation of the brake circuits in the event of a fault, e.g., a valve leak, and to reduce pressure in the wheel brakes, it is advantageous if a connection module with switching valves is arranged between the brake circuits, so that either the brake circuits are connectable to one another, separable from one another and/or one or both brake circuits can be connected to the reservoir, in particular if no actuating device is provided via which a pressure reduction in the reservoir can take place. Solenoid valves that are open in the de-energized state are advantageously used to connect the brake circuits to the reservoir. For the connection between the pressure units, de-energized closed solenoid valves or hydraulic fluid transfer pistons that can be locked in position should preferably be used in the connection module.

The connection module can either have a plurality of solenoid valves, for example, via which a hydraulic connection can be established between a brake circuit and the reservoir or between the two brake circuits. However, it is also possible that the connection module is formed by a piston-cylinder unit, the piston of which separates a first and a second pressure chamber from one another, the first pressure chamber being connected to a first brake circuit and the second pressure chamber to the other second brake circuit and the piston can be locked by means of a blocking device. In the locked state, there would be virtually no hydraulic connection between the brake circuits, since a volume shift is prevented.

It is also advantageous if the piston-cylinder units of the braking system have redundant seals and hydraulic diagnostic lines and redundant control and regulating units are also provided, and that the drives of the pressure supply devices have 2×3 phases, and that by means of sensors of the motor current $i_{phase}$, the motor angle $\alpha$, in particular the temperature T, is measured and taken into account in the pressure control, and that there is in particular a redundant supply via two vehicle electrical systems or voltage levels, and in that redundant signal transmission is provided. The provision of all these measures advantageously results in a very safe system which is suitable for AD levels 3-5.

A reservoir can advantageously be used in the braking systems described above which has a plurality of separate chambers, one chamber of the reservoir being hydraulically connected or connectable to at least one pressure supply device and/or an additional chamber being hydraulically connected or connectable to the connecting module. This advantageously results in additional circuit options by means of the valves used, which contribute to the additional safety of the braking system.

The above-described braking systems can advantageously be operated in such a way that the deceleration of the wheels is carried out by means of the pressure supply device(s), the electric drive motor(s) and the hydraulically supported electromechanical brake (H-EMB) at least for each axle, preferably for each wheel or the electromechanical brake (EMB). Torque vectoring can also be carried out by means of the pressure supply device(s), the electric drive motor(s) (TM) and the hydraulically supported electromechanical brake (H-EMB) or the electromechanical brake (EMB).

When using a temperature sensor, the temperature of the drive of the pressure supply device(s) can also be determined and the temperature can be used to more precisely determine the torque moment constant, which decreases linearly by the factor (1-Br %*ΔT) as a result of the temperature increase. This allows an even more precise control of the torque and thus of the pressure, as long as this is based on the phase current i, as the relationship torque=kt (T)*phase current i applies.

For pressure control, in addition to the current control, the piston position and the pressure volume characteristic can also be used and the change in the pressure volume characteristic in the case of, e.g., air inclusion, can be adjusted by the pressure sensor or the H-EMB. The combined use of the two methods described above results in a high-precision pressure control that is also possible without a pressure sensor. This method provides additional redundancy in the event of failure of pressure transducers or can also be used to simplify the system with low redundancy requirements (e.g., system with only one or without pressure transducers).

The braking system according to the invention can also be used for steering/torque vectors, wherein the wheel-specific control options with the at least one pressure supply and the hydraulically supported electromechanical brake(s) H-EMB, electrical parking brake(s) EPB and/or electromechanical brake(s) EMB and/or drive motors or the steering EPS can be used.

The invention is thus characterized by a very simple structure with very high availability, i.e., in the event of a complete or partial failure of modules, the function is not restricted or is restricted to a very small extent. Even if various components fail, almost maximum deceleration and driving stability can always be ensured. For this purpose, a deceleration of 0.6 to 0.9 g and an axle-based control, preferably wheel-specific control with steering intervention/stability intervention is guaranteed even if a pressure supply device fails. A high level of availability and performance is thus achieved—once again collectively—through the following measures, which can be provided individually or in combination:

Mainly operation in the closed brake circuit (>90% of the operating time) both in the brake booster (e-BKV), recuperation operation and mainly in ABS control operation, thus avoiding dormant faults. If the system is operated in an open manner, for example in the ABS it is hydraulically connected to the reservoir by opening an outlet valve of the wheel circuit, which makes undetected leaks in valves and seals (dormant faults) particularly difficult to detect. Therefore, the operating state should be avoided or a diagnosis of the tightness after every ABS operation is useful; a diagnosis can take place in such a way that, for example, when the valve is closed, the piston of the pressure supply is moved and a volume loss or pressure increase is determined and evaluated.

Redundancies and partial redundancies of the DV motor electronics: e.g., design of the motor of the DV as a 2×3 phase motor as well as partial redundancy of the motor control. This means that if one of the electronic components fails (winding short circuit, failure of a 3-phase line), the motor can still be operated with half the torque. With a design for 200 bar, 100 bar, i.e., approximately the blocking pressure, can then also be achieved in the event of failure. This means that even if one of the electronics fails, ABS operation with maximum performance with low coefficients of friction and satisfactory performance in road conditions with a high coefficient of friction is possible;

Partial redundancies of the electronics for the valve control. If the electronics fail, it is very advantageous for availability if the switching valves can still be operated. This means that redundancy for the valve control must be provided in the electronics so that the valve actuation still functions if the motor control fails;

Operation in closed MUX operation with switching valves and use of outlet valves (at least 1 AV per axle) in the event of a fault, i.e., failure or partial failure of a pressure supply. This means that the pressure control dynamics can still be maintained with low motor power, since the pressure cannot only be built up and reduced sequentially or simultaneously by the pressure supply, but pressure can also be reduced via outlet valves;

Use of an H-EMB, EMB or EPB in braking operation, in particular use of EPB or H-EMB in the event of module failure. This means that, on the one hand, the wheel can be braked via the hydraulic access and via the electric motor built into the H-EMB. The electric motor can be designed as an EC motor or a brush motor. Thus, braking assistance can be provided by the electric motor on the respective wheel;

Use of the used traction motors to increase the braking torque with simultaneous recuperation of kinetic vehicle energy. Due to the high inertia of the drive motor, however, it must be taken into account that a braking torque can be built up less dynamically via the traction motor than via the pressure supply and the H-EMB, EPB or EMB;

Use of a fail-safe and diagnosable actuating unit with pedal feel simulator, redundant displacement sensors and a force-displacement sensor (KWS) as well as a special circuit for diagnosing the pedal feel simulator;

Use of valves with a self-opening mechanism through the application of pressure by the wheel brake, in particular in the de-energized state;

Use of a diagnosable connection module (VM) with which the brake circuits can be safely connected or disconnected and the wheel brakes can be connected to the reservoir, in particular if the system does not have an actuating device (BE) with a connection to the reservoir;

Use of a hydraulic fall-back level in a brake circuit or an axle via connection of the actuating unit via a switching valve FV;

Subsequent delivery of volume of the DV when the volume limit is reached;

Operation of the pressure position without pressure transducer through intelligent, precise torque estimation from the motor phase current, taking into account the motor temperature and the pressure volume characteristic, which is compared via a pressure transducer or the H-EMB function;

Switching from normal operation 2-wheel operation in the MUX method to 4-wheel operation in the MUX 2.0 method with AV in the event of failure of a DV Use of trapezoidal spindle (no blocking of the spindle by dirt particles in the raceway of the ball screw drive);

Self-locking trapezoidal spindle→dispensing with FV and TV.

The operating strategies of embodiment 1 (2 pressure supplies without connection module, FIG. 1) and embodiments 2 and 3 (2 pressure supplies with connection module, FIGS. 2 and 3) are described in FIGS. 8 and 9.

Figure 10:
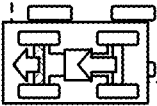

FIG. 10 shows the brake and various dynamic control functions (electric brake booster e-BKV, ABS operation, steering/torque vectoring, stability control/ESP, recuperation and parking brake) which can be formed by the components pressure supply DV1 and DV2, drive motor TM1, TM2, steering EPS and hydraulically supported EMB or parking brake EPB. Thus the primary function and the secondary function/redundancy are identified. This makes it clear that the most important vehicle dynamics functions are available in at least a double redundant manner. When designed as a 2×3 phase motor and connection module, the pressure control can even be viewed as triple redundant.

The braking system according to the invention is therefore suitable for all levels of autonomous driving up to level 5 (AD).

The braking system can also be simplified in such a way that a very cost-effective system with lower redundancy requirements and a sensible combination of the primary supply device with the brake units, for example for BRIC countries such as India, Brazil, China, is derived from the system. Here the redundancy of the pressure supply device with redundant ECU, for example 2×3 phases, is dispensed with and the hydraulic fall-back level via pressure production by the vehicle driver via the actuating unit and a deceleration by the electric motor TM is used. This means that even with a simple actuating unit with a piston (HZ), the current legal requirements for braking decelerations of up to 0.3-0.5 g for autonomous driving at levels 1 to 2 can be achieved. In addition, for example, the pressure transducer can be dispensed with and controlled exclusively according to the PPC method. This means that faults F1 and F3 can no longer occur. An electric parking brake can also be omitted if a hydraulically supported brake H-EMB is used, or a hydraulically supported parking brake according to DE 10 2007 015809 is used and the pressure in the parking brake is locked in with a solenoid valve. If the hydraulic line fails or there is a leak, additional delivery can be made or a holding torque can be produced via the traction motor.

The pressure supply device according to the invention can also be driven by a rotary pump, which can in particular be a gear pump. It can then have a motor housing with an electric-motor drive arranged therein, which drives the gear pump. The drive has a stator and a rotor for this purpose. An internal gear of the gear pump is moved via the rotor of the drive. According to the invention, the drive is designed as a dry runner by means of at least one seal, which is arranged between the rotor and the inner gear wheel, or has a dry running rotor, i.e., the medium conveyed by the gear pump does not flow around the rotor of the drive and/or is not surrounded by the medium. Due to the design as a dry runner, the rotor rotates without major friction and flow resistance, which means that higher speeds and better efficiency can be achieved.

A particularly compact and simple pressure supply device is obtained when the motor housing has a side wall on which the gear pump is arranged, in particular this has a recess in which the gear pump is at least partially or entirely inserted. The side wall of the motor housing can be penetrated by a shaft connected to the rotor in a rotationally fixed manner, the gear wheel either being connected to the shaft in a rotationally fixed manner or being coupled to the shaft via an interposed gear and/or a coupling.

An advantageous compact and integrated design of the pressure supply device described above is obtained if the drive with its housing rests against a hydraulic housing with at least one valve and/or hydraulic lines or channels arranged therein or forms a unit therewith. The side wall of the drive housing can abut or adjoin the side wall of the hydraulic housing, in particular be attached thereto, the particularly cup-shaped recess receiving the gear pump at least partially or completely and being open towards the hydraulic housing. With housings arranged next to one another, the gear pump can either rest entirely in the recess in the wall of the drive housing, entirely in a recess in the hydraulic housing or both in a recess in the side wall of the drive housing and in a recess in the side wall of the hydraulic housing. In the latter case, the openings of the two recesses then face one another. Additional seals can be provided in order to seal the two housings to one another and to the outside.

The above-described recess in the side wall of the drive housing is advantageously open to the outside and, if a hydraulic housing is present, opens thereto. The recess itself can advantageously be designed in the shape of a pot. It can also have a cylindrical section which is circular in cross-section and in which the gear pump rests with its gears.

The side wall of the drive housing can also advantageously be designed as a flange with which the drive can be fastened to another part or unit.

The gear pump used in the pressure supply device according to the invention can be an internal gear pump with a sickle, an external gear pump or a toothed ring pump.

The gear pump can also advantageously be arranged axially next to the stator and/or the rotor of the drive, the structure and size thereof is not disadvantageously limited by the gear pump. The size and structure of the gear pump is then not dependent on the dimensions of the stator and the rotor.

The drive housing can be designed in at least two parts, the side wall being part of or forming a first housing part. The second housing part can, for example, be pot-shaped and accommodate the stator and the rotor of the drive.

As already stated, the rotor is connected to the gear by means of a drive shaft directly or via a transmission and/or a clutch. The gear can be connected to the drive shaft in a rotationally fixed manner either by means of a force-fit connection or by means of a form-fit connection, which is formed in particular by means of a pin or serration. In the gear ring pump, the inner gear is arranged eccentrically on a part connected to the drive shaft, in particular in the form of a disk or a cam disk.

Both when the gear pump of the pressure supply device according to the invention is designed as an internal gear pump or as a toothed ring pump, an external internal gear rim is also necessary in addition to the inner ring gear. In the case of the internal gear pump, the inner ring gear is rotated about its axis of rotation by means of the internal gear wheel driven by the drive shaft, the inner gear wheel being arranged eccentrically to the inner ring gear. The inner ring gear rotates in an outer ring or cylinder surrounding it. In addition, a sickle must be provided which must be arranged in the space between the inner gear and the inner gear wheel resulting from the eccentricity.

In contrast to the internal gear pump, the inner ring gear is fixedly arranged in the gear ring pump, the inner gear rolling, due to its eccentric mounting on the disk, being rotated by the drive shaft in the inner ring gear. A sickle as with the internal gear pump is not required.

According to the invention, the drive shaft can either be supported or mounted
 a) in the motor housing, on the one hand, and in the gear pump and/or in the hydraulic housing on the other hand, or
 b) only in the gear pump or
 c) in the hydraulic housing and in the motor housing or
 d) in the gear pump and in the hydraulic housing
by means of suitable bearings, in particular radial bearings, in the form of ball or roller bearings and/or axial bearings.

If a hydraulic housing is provided, the drive shaft can extend into the hydraulic housing, in particular up to its side opposite the drive. For example, a target for a sensor can be arranged on the drive shaft, the sensor being arranged in the control and regulating unit (ECU). Additional seals can prevent the delivered medium from entering the control and regulating unit. It is also possible that the drive shaft extends right through the hydraulic housing and ends in the housing adjoining it, for example an control and regulating unit.

The gear pump can be designed differently as an internal gear pump. Thus, in a first embodiment, the inner gear, the inner ring gear, the sickle and the outer ring can be arranged between two disks, with the disks being firmly connected to the outer ring after appropriate centering and adjustment of the parts to one another. The cohesive connection can extend all the way around the circumference, resulting in a stable and compact embodiment in which the individual moving parts have only small clearances and gaps with one another, whereby good efficiency is achieved and high pressure can be achieved.

Possible embodiments of the braking system according to the invention are explained in more detail below with reference to drawings.

IN THE FIGURES

Figure 1A:
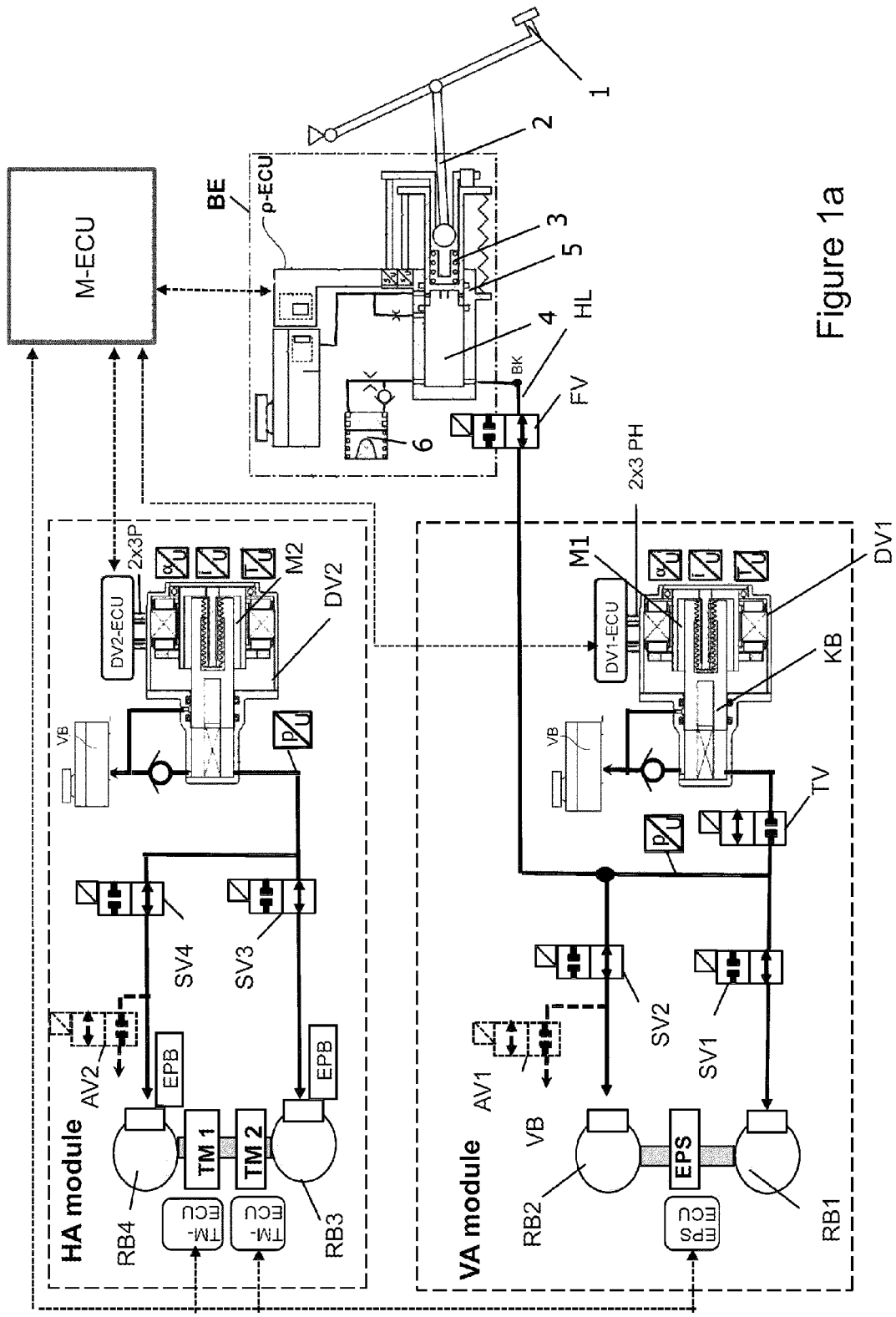
Figure 1B:
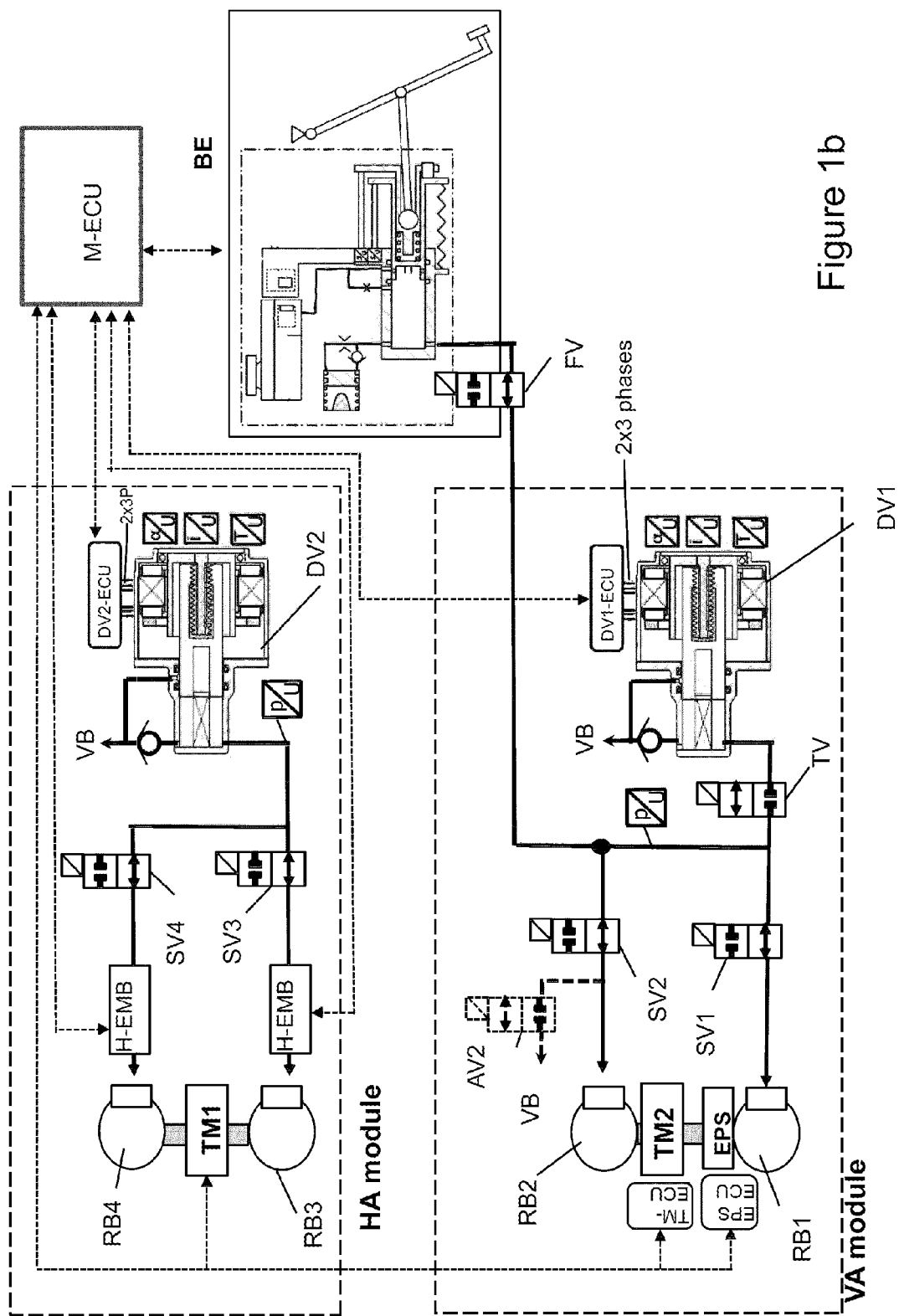
Figure 2:
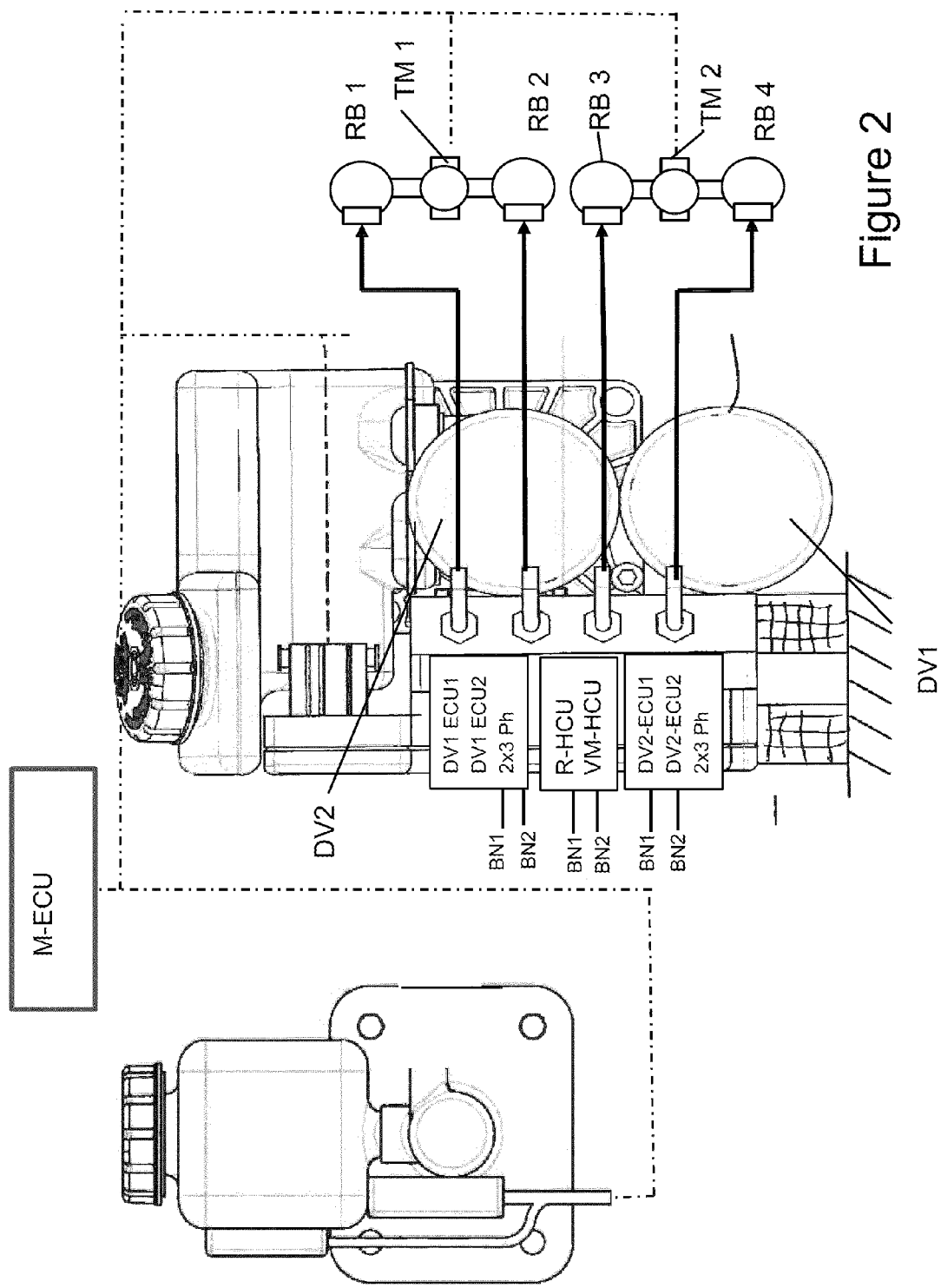
Figure 3:
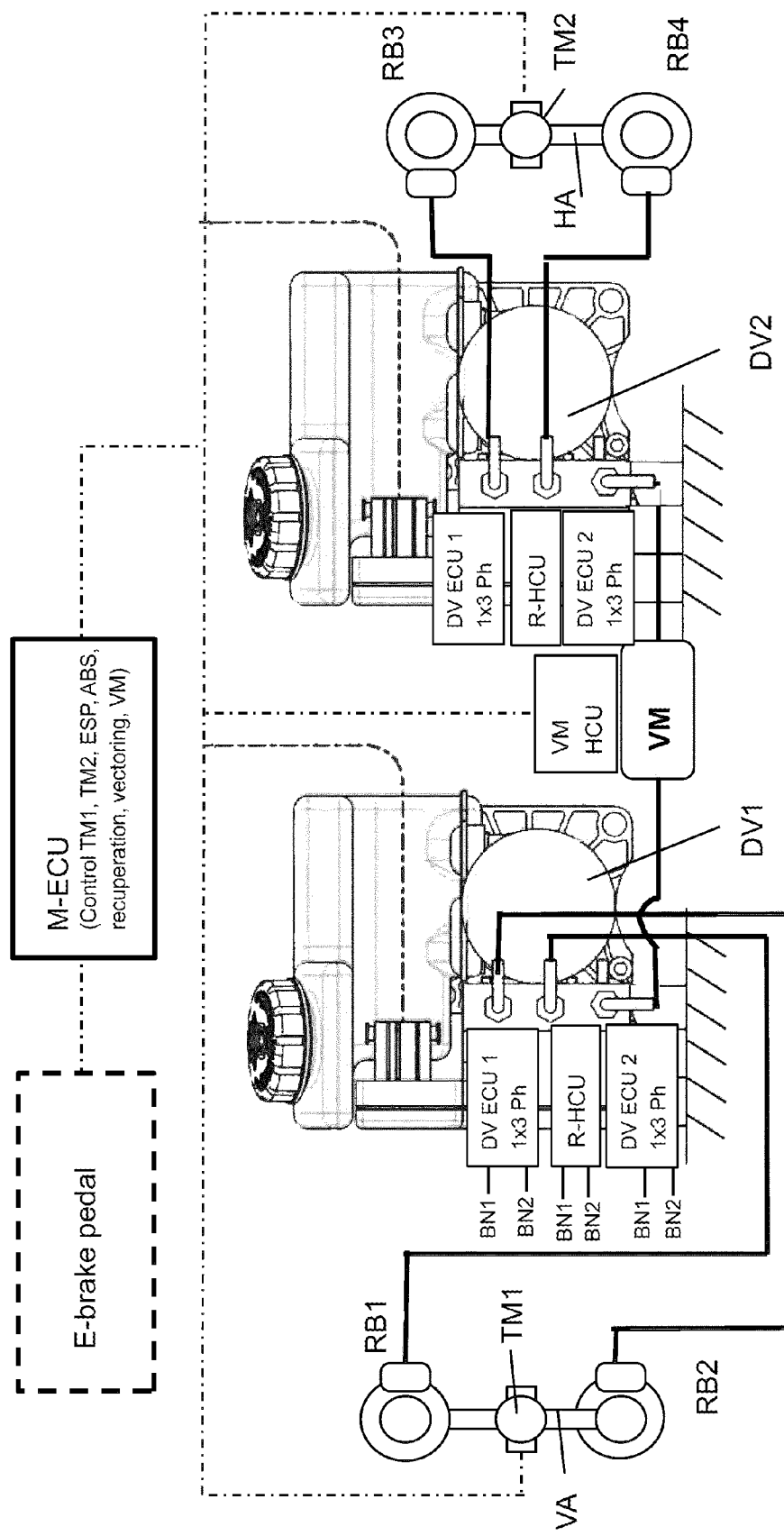
Figure 3A:
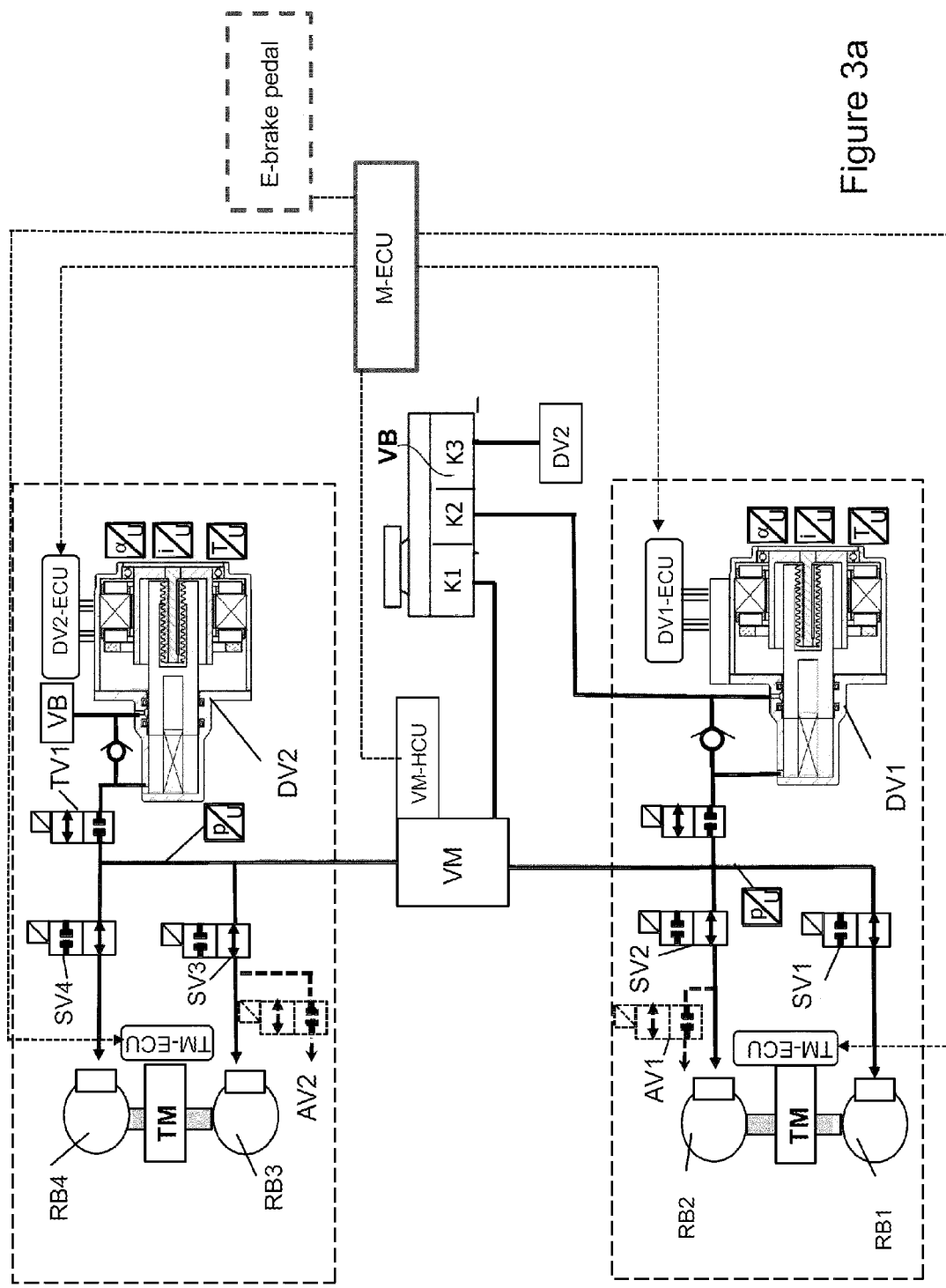
Figure 3B:
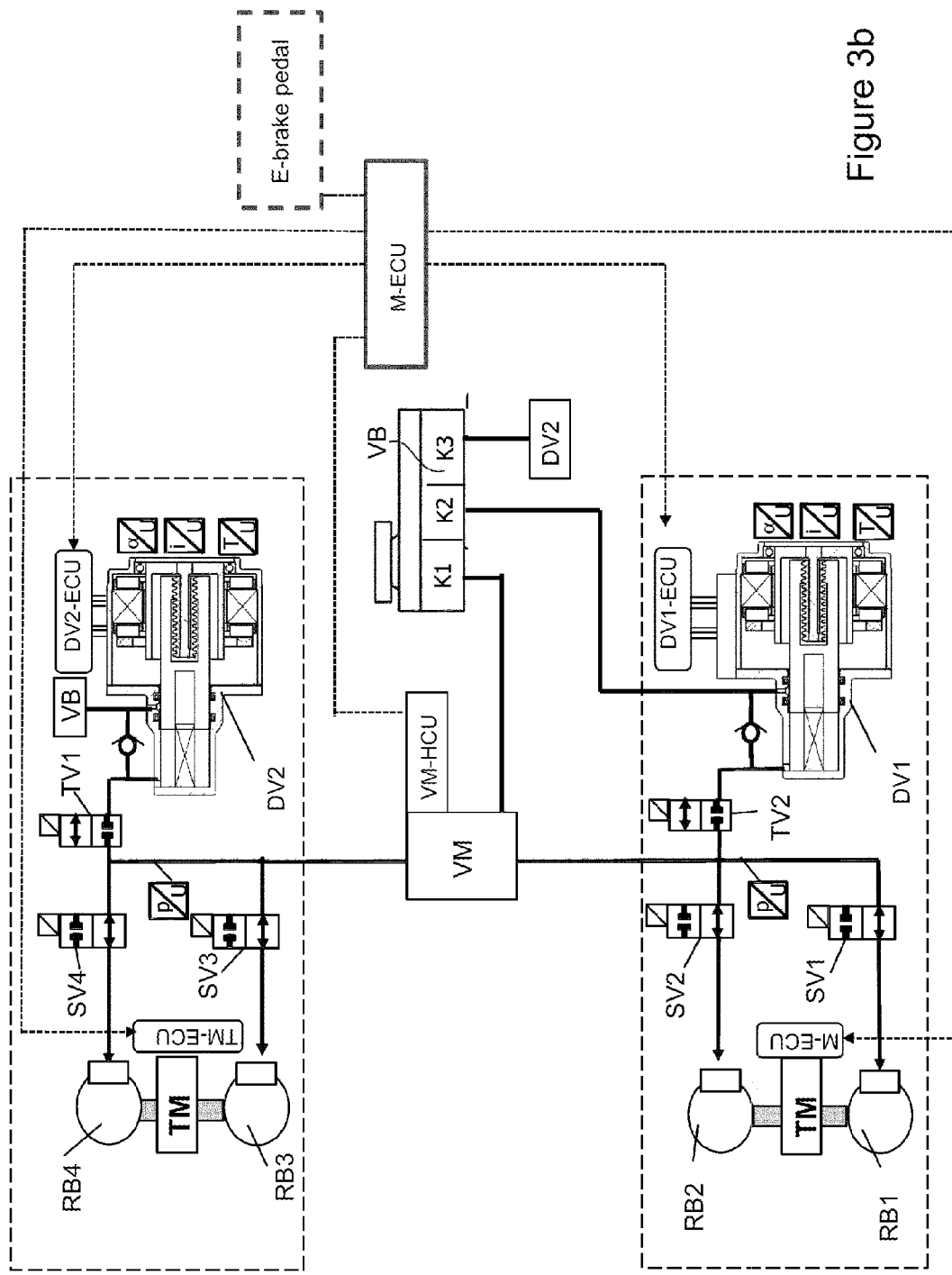
Figure 3C:
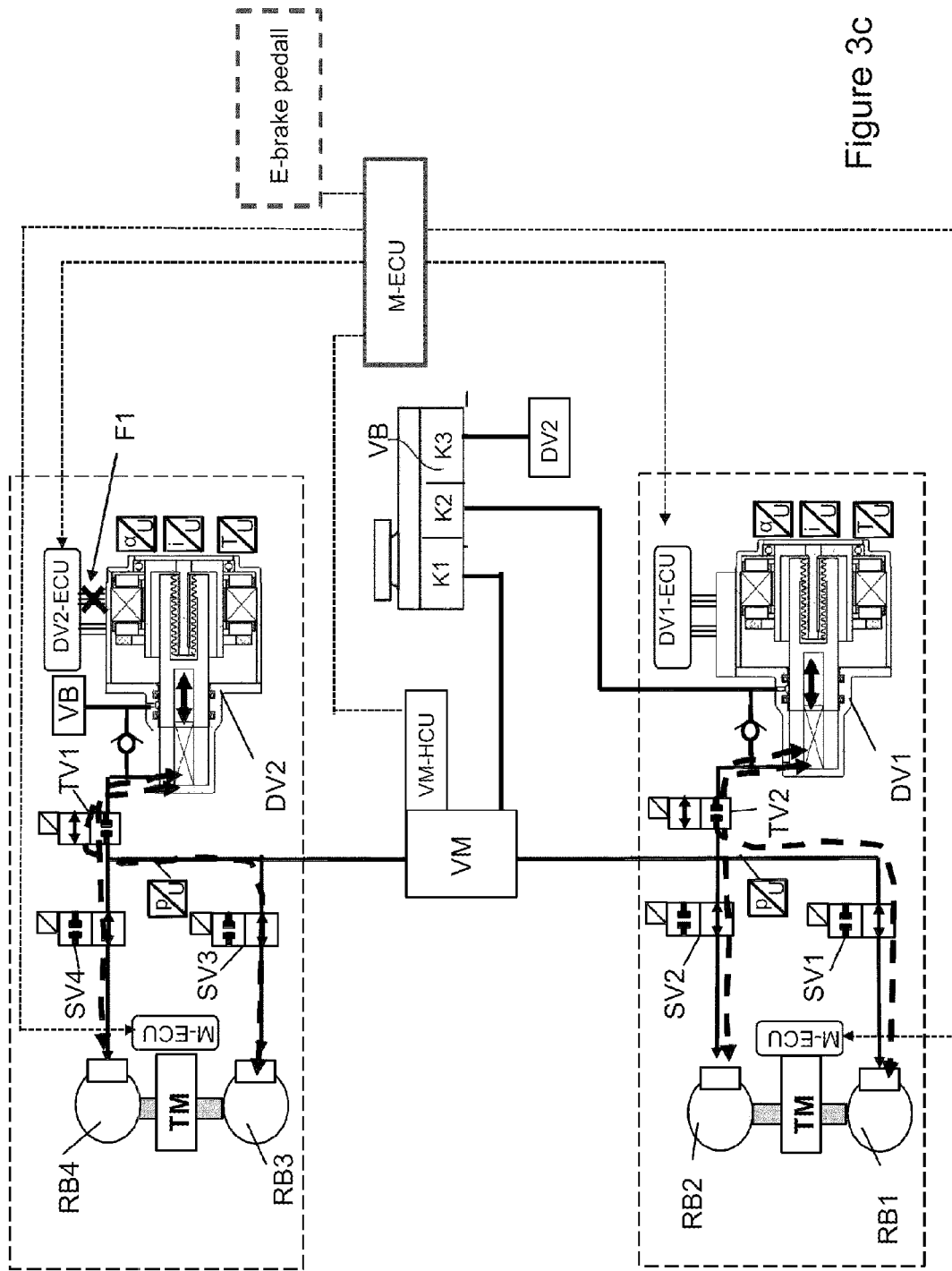
Figure 3D:
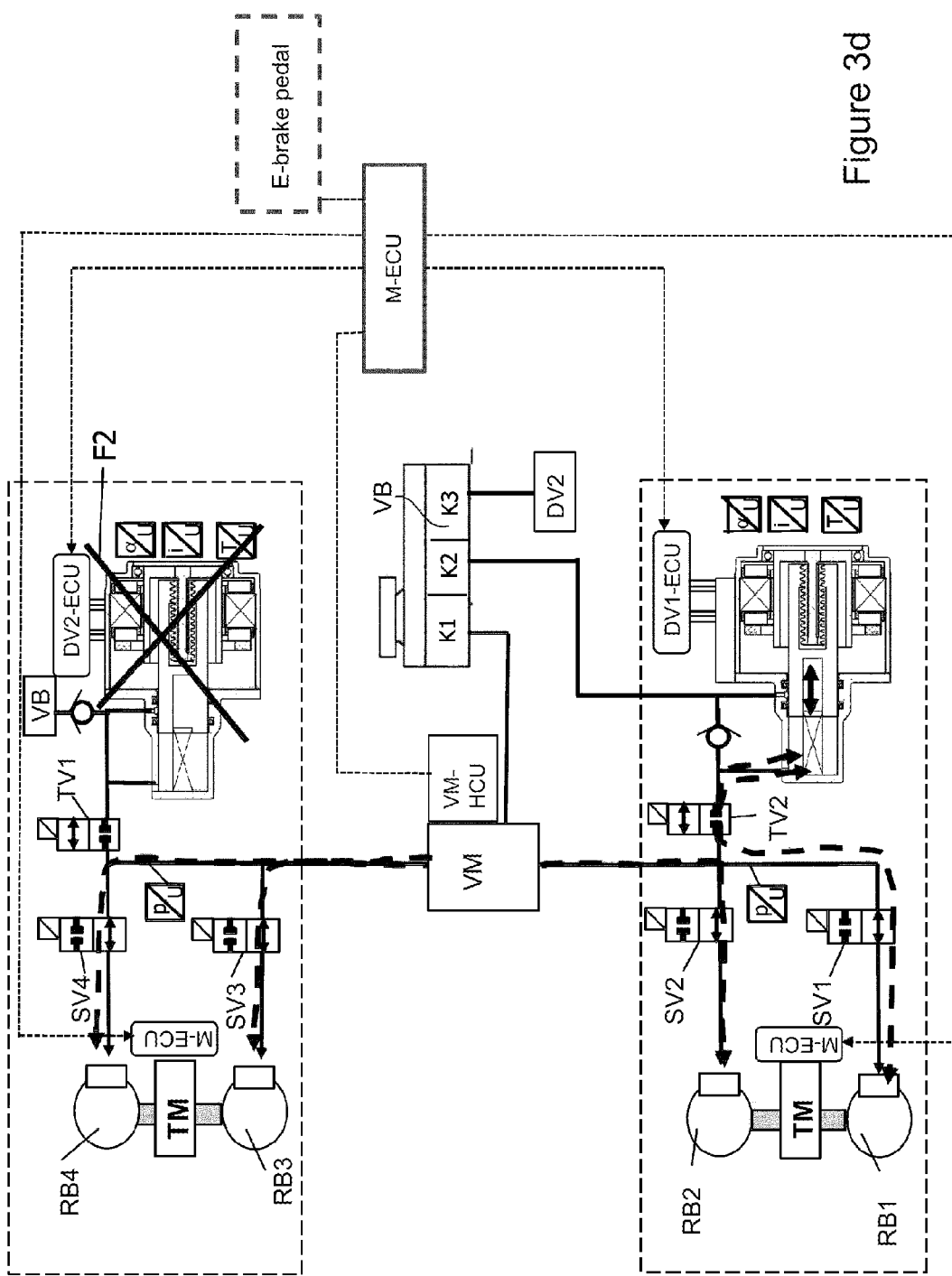
Figure 4A:
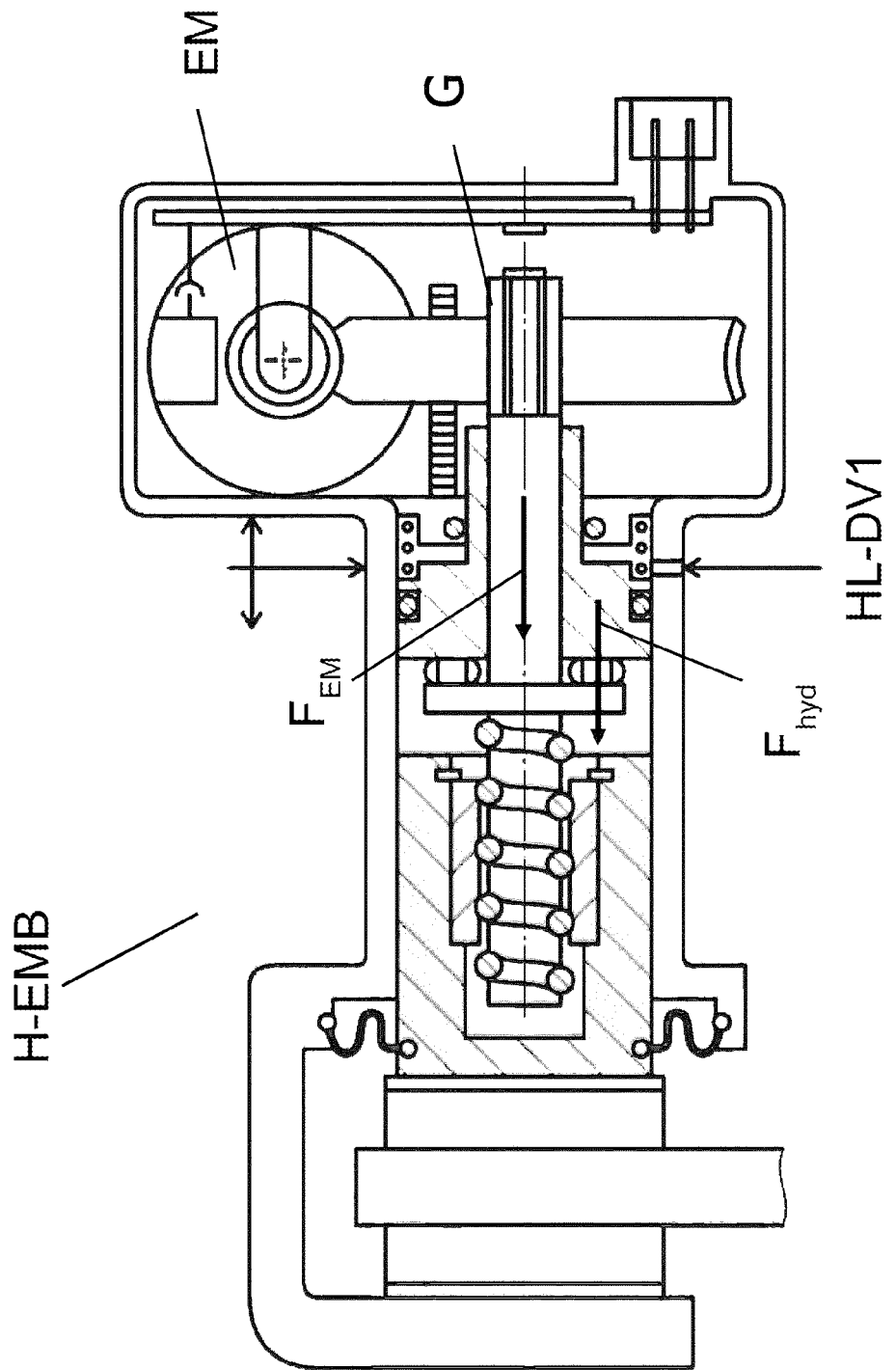
Figure 4C:
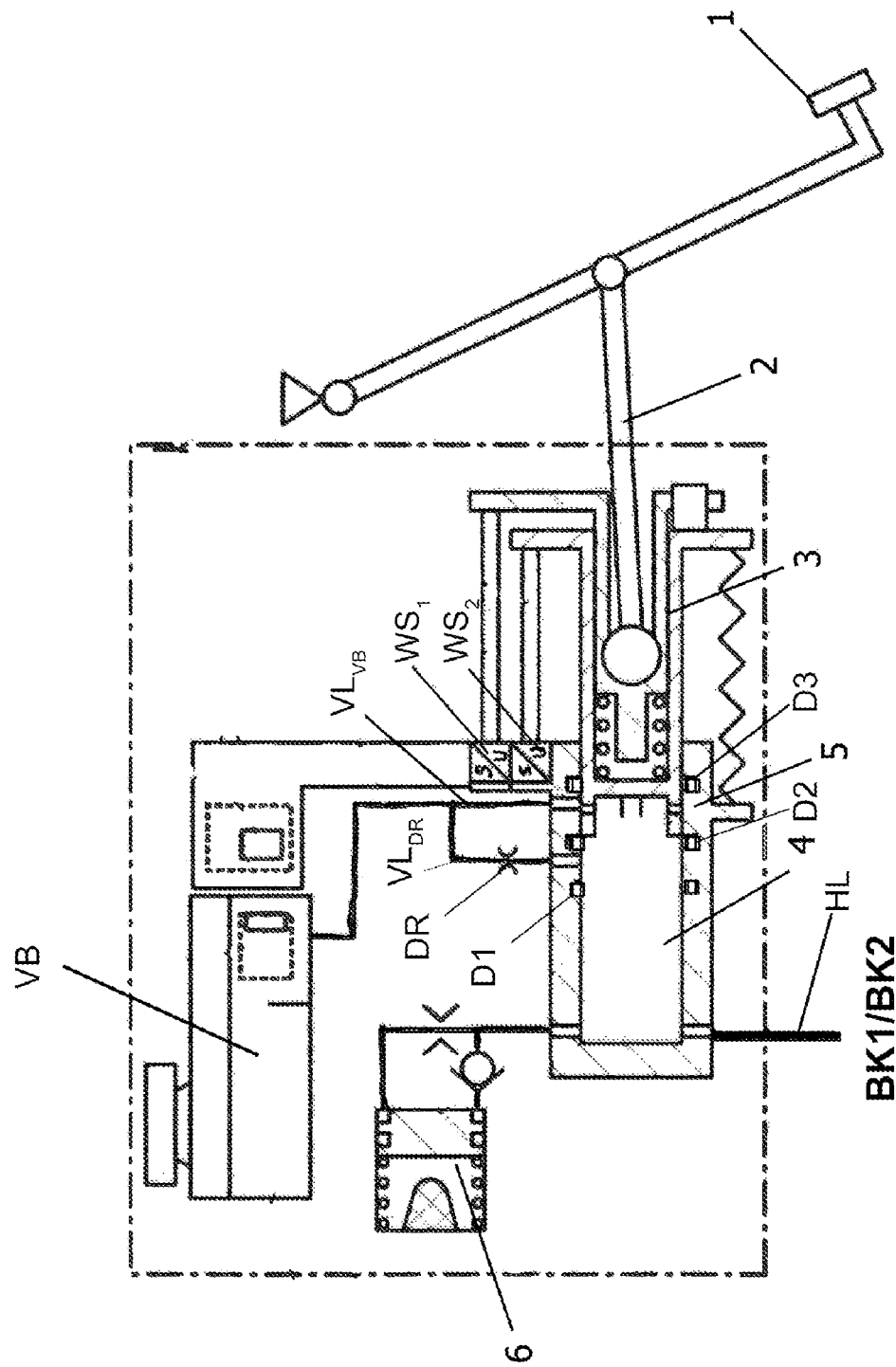
Figure 5:
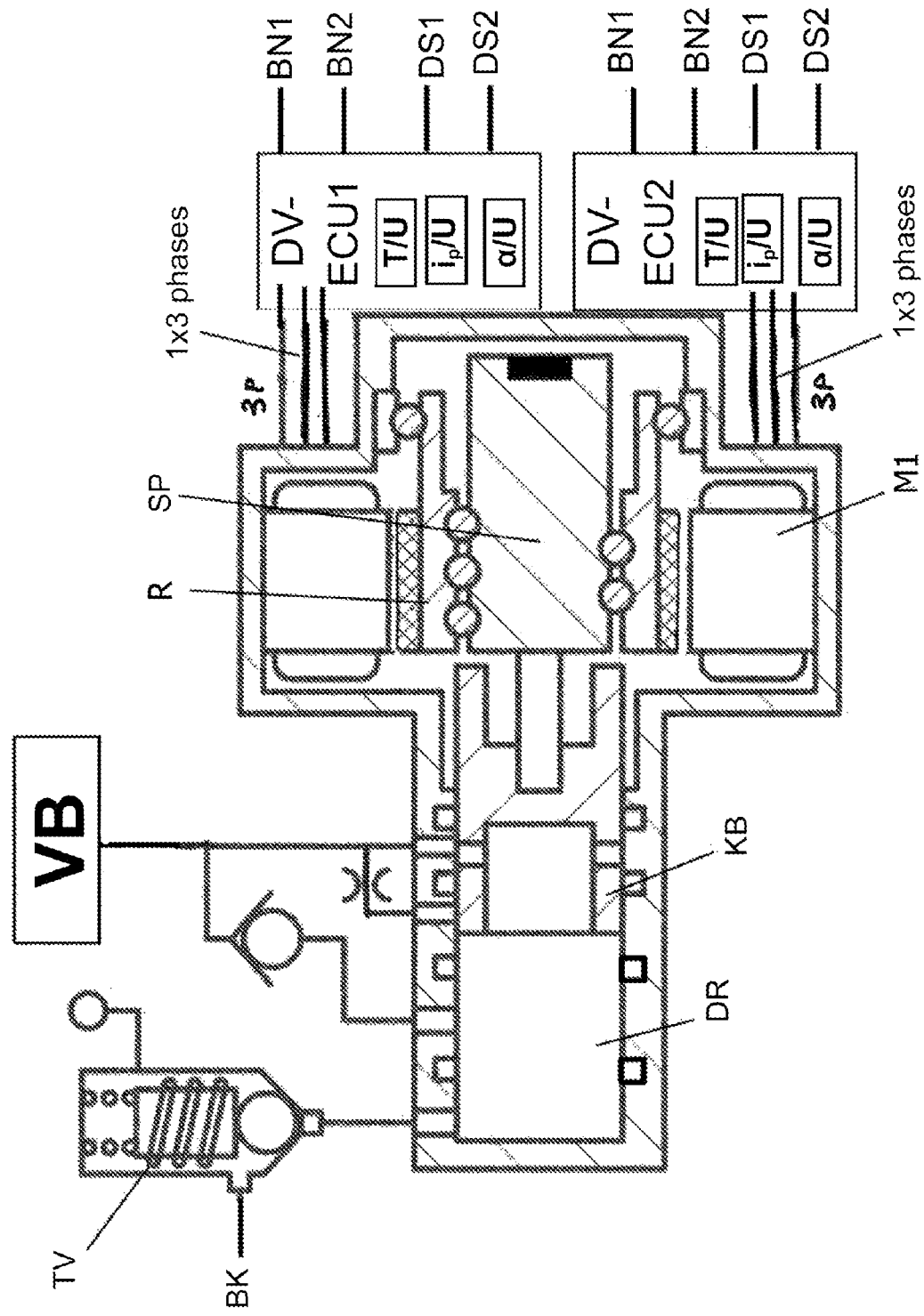
Figure 6B:
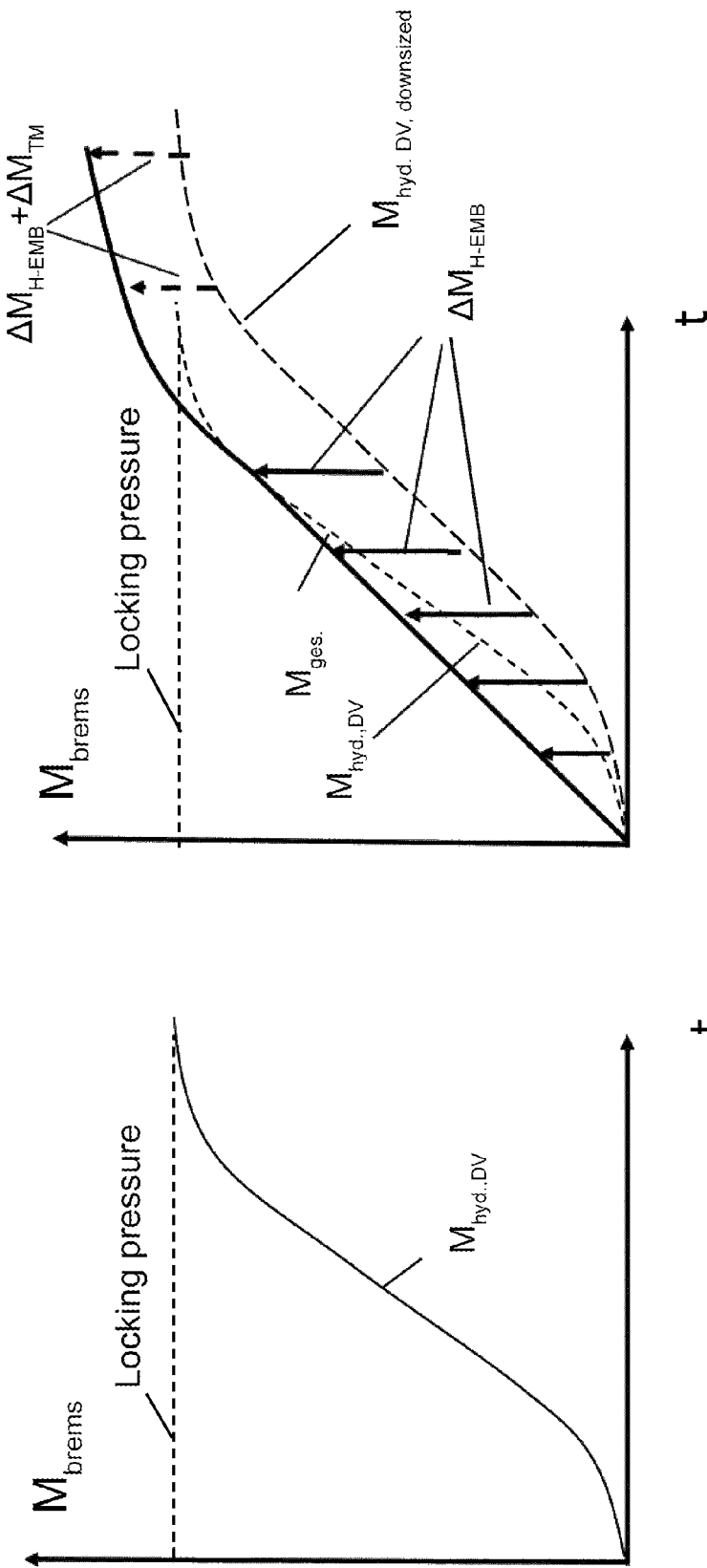
Figure 6C:
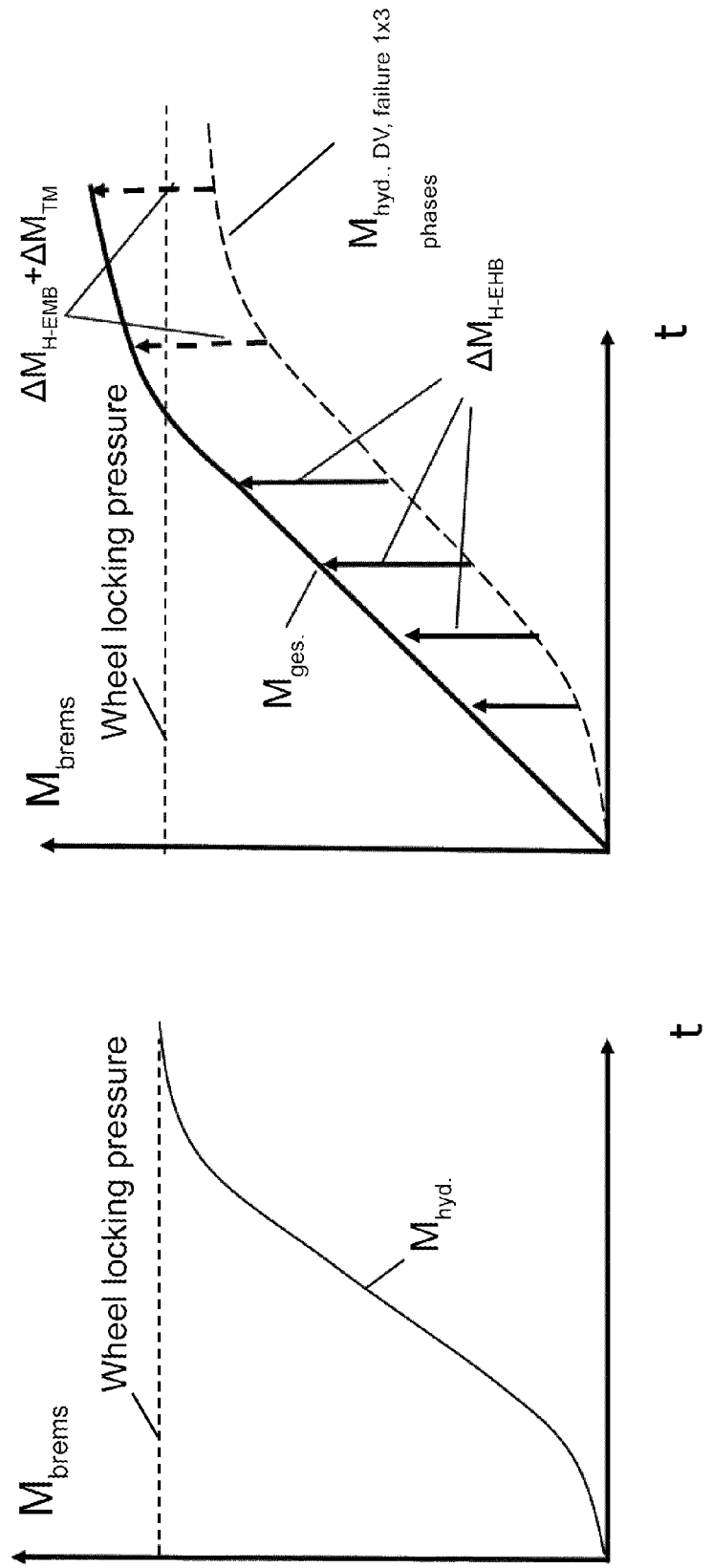
Figure 6D:
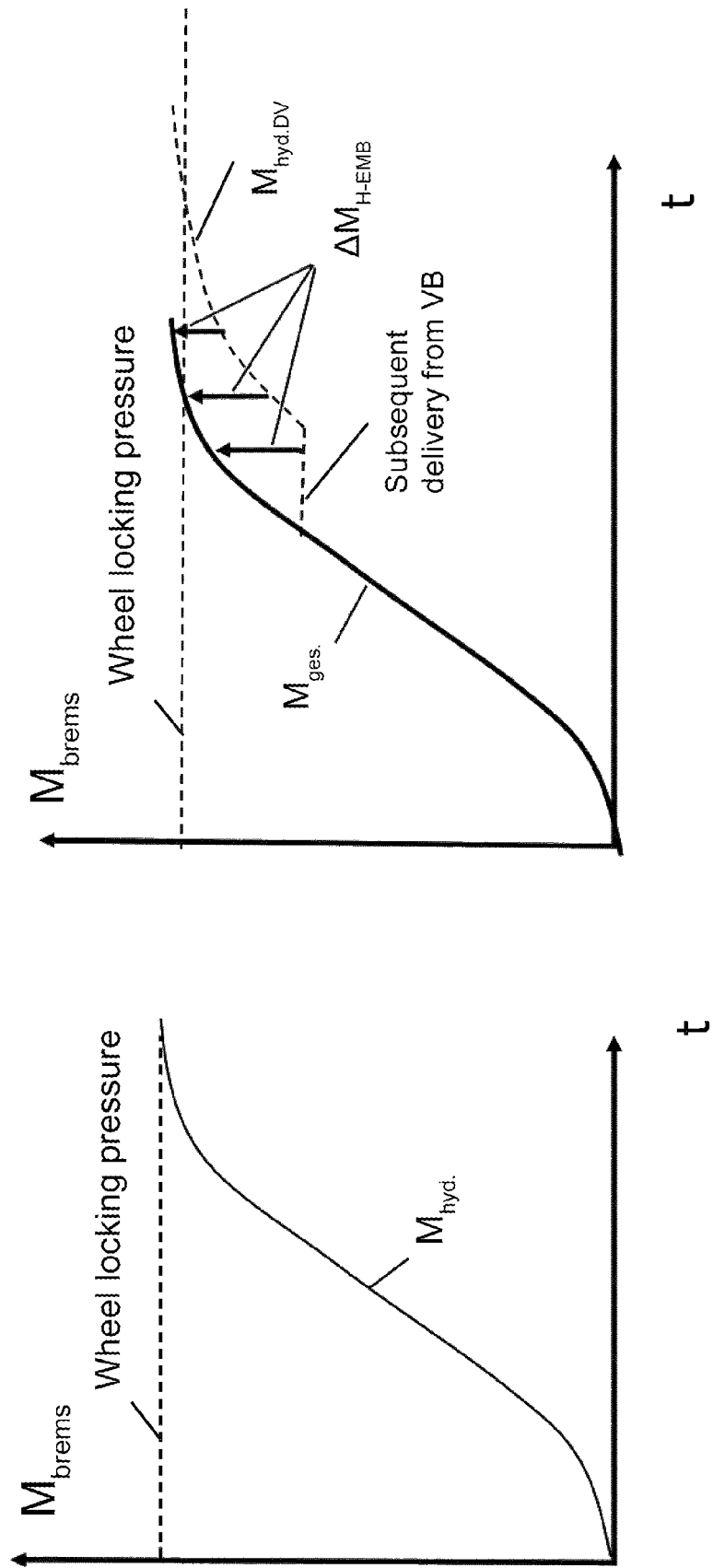
Figure 6E:
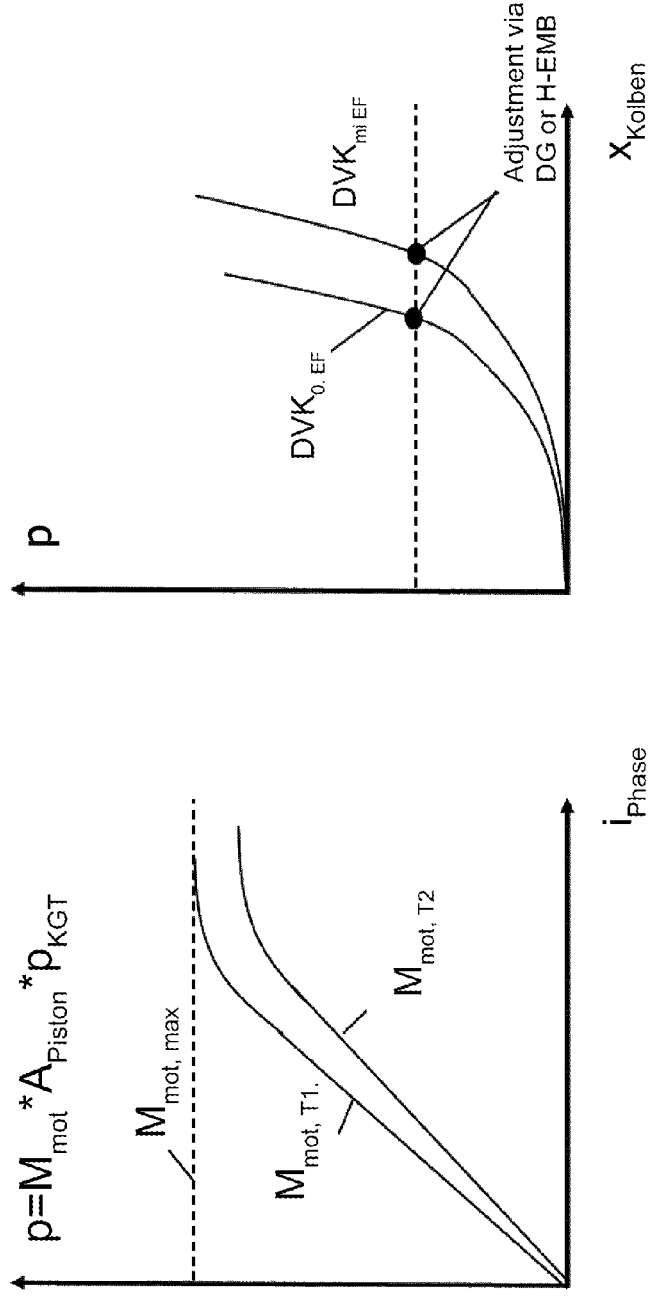
Figures 7A, 7B:
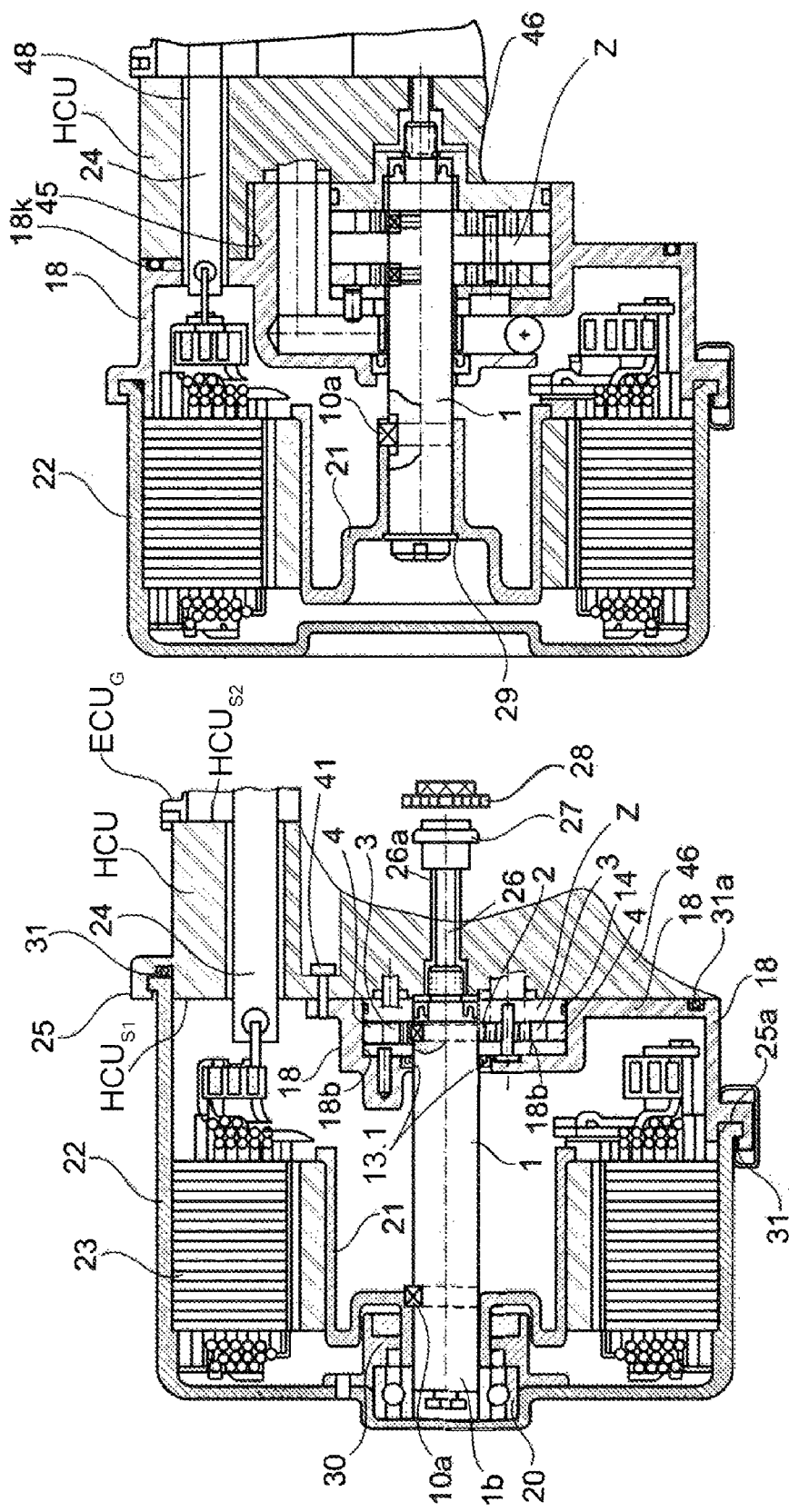

FIG. 1: shows a schematic representation of a first embodiment of the braking system according to the invention with two pressure supply devices, solenoid valves, control and regulating devices in two pressure control module units, each unit being connected to 2 wheel brakes and an actuating unit (BE) which has a hydraulic connection to a pressure control module unit;

FIG. 1a: shows a basic circuit diagram of a first possible embodiment of the braking system according to FIG. 1 with an electric parking brake EPB;

FIG. 1b: shows a basic circuit diagram of a second possible embodiment of the braking system according to FIG. 1 with a hydraulically supported electromechanical brake H-EMB;

FIG. 2: shows a schematic representation of a second possible embodiment of the braking system according to the invention with two pressure supply devices, solenoid valves, control and regulating devices in a pressure control module assembly, each pressure supply being connected to 2 wheel brakes and an actuating unit (BE) that has an electrical connection with the pressure control module, the brake circuits being connectable to or separable from one another via a connecting module or being connectable to the reservoir;

FIG. 3: shows a schematic representation of a third embodiment of the braking system according to the invention with two pressure supply devices, solenoid valves, control and regulating devices in two pressure control module assemblies, each assembly being connected to 2 wheel brakes and both brake circuits being connectable to or separable from one another via a connecting module or being connectable to the reservoir;

FIG. 3a: shows a basic circuit diagram of a first possible embodiment of the braking system according to FIG. 2 or 3;

FIG. 3b: shows a basic circuit diagram of a second possible embodiment of the braking system according to FIG. 2 or 3;

FIG. 3c: shows a pressure control in a braking system according to FIG. 3a in the event of failure of a three-phase winding of a drive motor of a pressure supply device;

FIG. 3d: shows a pressure control in a braking system according to FIG. 3a in the event of failure of a pressure supply device;

FIG. 3e: shows subsequent delivery from the reservoir into a pressure supply device;

FIG. 4a: shows a cross-sectional representation through a hydraulically supported electromechanical brake;

FIG. 4b: shows a basic circuit diagram of possible valve circuits and their function for reducing pressure in a wheel brake;

FIG. 4c: shows an actuating device (BE) with associated piston-cylinder unit with hydraulic connection line to a brake circuit;

FIG. 5: shows a pressure supply device with two control and regulating devices;

FIG. 6a: shows torque diagrams to show the braking force support by means of hydraulically supported electromechanical brakes and traction motors;

FIG. 6b: shows torque diagrams to show the downsizing possibility of the pressure supply device, provided that braking force support is provided by means of hydraulically supported electromechanical brakes and traction motors;

FIG. 6c: shows torque diagrams to show the braking force support by means of hydraulically supported electromechanical brakes and traction motors in emergency operation in the event of failure of components of the braking system;

FIG. 6d: shows torque diagrams to show the braking torque curve during the demand for brake fluid with the braking force support by means of hydraulically supported electromechanical brakes and traction motors;

FIG. 6e: shows a brake pressure control in the event of failure of the pressure transducer by means of current and temperature measurement and evaluation of the pressure-volume characteristic curve;

FIG. 7a: shows a unit consisting of electric motor 22, single-stage rotary pump Z, HCU with solenoid valves and ECU;

FIG. 7b: shows a unit consisting of electric motor 22, two-stage rotary pump Z, HCU with solenoid valves and ECU;

FIGS. 8 and 9: show operating strategies in the event of failures in various embodiments; and FIG. 10: shows primary function and secondary function/redundancy.

FIG. 1 shows a schematic representation of a first embodiment of the braking system according to the invention with two pressure supply devices DV1 and DV2, which are used to supply pressure to the wheel brakes RB1-RB4 of brake circuits BK1 and BK2 or an axle VA, HA. The pressure supply devices each have two control and regulating devices DV ECU1 and DV ECU2 and a valve assembly R-HCU, the components of the pressure supply devices DV1 and DV2 being supplied via two vehicle electrical systems or voltage supplies BN1 and BN2. In addition, redundant signal lines DS1, DS2 to the control and regulating devices (shown in FIG. 5, not shown in FIG. 1) to the central control unit M-ECU are preferably provided. Each ECU is used to control one of the two winding or 3-phase systems (1-3Ph DV-ECU1, 1×3Ph DV-ECU2) of the drive motor of the pressure supply device DV1 and DV2). In this embodiment, two traction motors TM1 and TM2 for driving and supporting braking of the vehicle wheels are arranged on the rear axle HA. The braking system also has an actuating device BE, via which a brake pressure can be built up in the wheel brakes in the event of a fault, in this embodiment in the wheel brakes of the front axle VA. The traction motors TM1 and TM2 provide support in the fall-back level, i.e., failure of the pressure supply during braking of the rear axle HA. To increase the reliability, the components of the pressure supply devices DV1 and DV2 are each supplied via two independent vehicle electrical systems BN1 and BN2, it being possible for two different voltage levels to be provided instead of the vehicle electrical systems.

FIG. 1a shows a basic circuit diagram of a first possible embodiment of the braking system according to FIG. 1 with an electric parking brake EPB. The pressure supply device DV1 takes over the pressure supply for the front axle VA with the two wheel brakes RB1 and RB2, an electric power steering EPS being additionally provided. By means of the switching valves SV1 and SV2 and the optional outlet valve AV1, the pressure in the wheel brakes can be controlled sequentially or simultaneously by means of the pressure supply device DV1. It is possible that a pressure build-up takes place in the wheel brake RB1 by adjusting the piston KB of the pressure supply device DV1 and a simultaneous pressure reduction in the wheel brake RB2 takes place by opening the outlet valve. The pressure control in the wheel brakes is preferably carried out in MUX multiplex operation and can be done either by means of the pressure measured in the brake circuit—or by means of the motor current $i_{phase}$, the position of the piston KB and a pressure-volume characteristic. Optionally, the temperature of the motor M1 can also be measured and used for more precise pressure control.

The same applies to the pressure control in the rear axle HA, which takes place by means of the pressure supply device DV2 and the switching valves TV, SV3 and SV4 as well as the optional outlet valve AV2. The pressure is controlled by means of the pressure transducer p/U. If the pressure transducer fails, the pressure is controlled via the measured motor current $i_{phase}$, the rotor angle α, and optionally by means of the measured motor temperature T of the drive motor M2 of the pressure supply device DV2.

If the pressure supply device fails, the pressure in the wheel brakes of the front axle can take place via the actuating device BE, in which the piston 3 in the cylinder 5 is adjusted by means of the brake pedal 1 and hydraulic medium is thus conveyed from the pressure chamber 4 into the brake circuit BK of the front axle VA.

A superordinate control unit M-ECU controls the individual control and regulating units of the components of the braking system. This is particularly useful for a holistically optimized vehicle dynamics control, where, for example, synergies of steering, yaw moment control via brakes, torque vectoring via brakes and traction motors, and the interaction of brakes and electric motors in vehicle deceleration can be achieved.

The pressure supply devices DV1 and DV2 each have redundant control and regulating units DV1-ECU and DV2-ECU, which control the separate winding systems or phase system of the drive motors, so that even if a winding system of a motor M1, M2 or an control and regulating unit, the respective pressure supply device can still be used with reduced power for pressure control.

FIG. 1b shows a basic circuit diagram of a second possible embodiment of the braking system according to FIG. 1. The wheel brakes RB3 and RB4 of the rear axle HA are formed by hydraulically supported electromechanical brakes H-EMB, with which a braking force can be produced in control operation not only by means of the pressure supply device DV2 but also by means of its own electric drive. This can be used to support braking, torque vectoring, yaw moment control or in the event of a total brake failure. In addition, the traction drive TM1 can be used to produce a deceleration of the vehicle wheels either as a support or on its own. A traction drive TM2 and an electric power steering EPS with associated control and regulating units EPS-ECU and TM-ECU are also arranged on the front axle VA. All components of the braking system are controlled by the central control unit M-ECU.

FIG. 2 shows a schematic representation of a second possible embodiment of the inventive braking system with two pressure supply devices DV1 and DV2, which each have an control and regulating device DV-ECU1 and DV-ECU2 and a common valve control unit R-HCU for supplying pressure to an axle VA, HA or VM-ECU, each component of the pressure supply devices DV1 and DV2 being supplied via two vehicle electrical systems or voltage supplies or voltage levels. R-HCU comprises the solenoid valves of the wheel brake control, VM-ECU includes the valve circuit that ensures that either the brake circuits can be connected to one another, can be separated from one another and/or one or both brake circuits can be connected to the reservoir.

FIG. 3 shows a schematic representation of a third possible embodiment of the braking system according to the invention with two pressure supply devices DV1 and DV2, which are provided for supplying pressure to the wheel brakes of an axle VA, HA, these two control and regulating devices DV-ECU1 and DV-ECU2 and a valve assembly with control unit R-HCU, each component of the pressure supply device being supplied via two vehicle electrical systems or voltage supplies BN1 and BN2, and both brake circuits being connectable to or disconnectable from one another via a connecting module VM. Instead of an actuating device BE, in which hydraulic pressure can be built up in the wheel brakes via the brake pedal, the braking system according to FIG. 3 has an electronic brake pedal, which results in a break-by-wire braking system. The signals from the electronic brake pedal are processed by the central control unit M-ECU and the components of the braking system are controlled accordingly.

FIG. 3a shows a basic circuit diagram of a first possible embodiment of the braking system according to FIG. 3. The connection module VM also has a control unit VM-HCU and has a valve circuit that ensures that either the brake circuits of the front axle VA and rear axle HA are separated from one another or connected to one another or one or both brake circuits with the chamber K1 of the reservoir VB is in hydraulic connection. The pressure control in the wheel brakes can be carried out either using the pressure transducer p/U or by measuring the current and using the pressure volume characteristic. The pressure reduction in the wheel brakes RB2 and RB3, but also RB1 and RB4 by opening the switching valves SV1 to SV4 can optionally also take place via the optional outlet valves AV1 and AV2.

The braking system according to FIG. 3b differs from that shown in FIG. 3a only in that no outlet valves AV are provided. For this purpose, the drive motor of the pressure supply must be designed to be highly dynamic, e.g., in the form of a motor with a double air gap (U.S. Pat. No. 7,872,389 B2) or other units that produce braking force, such as traction motors, H-EMB (not shown), must be integrated into the braking force control.

FIG. 3c shows the braking system according to FIG. 3b with the fault case that in the pressure supply device DV2 a phase winding of the motor can no longer be controlled. In this case, however, the pressure control can continue to be operated by the redundantly provided winding systems and control and regulating units of the pressure supply devices. However, the pressure supply device DV2 for the wheel brakes RB3 and RB4 can no longer regulate the maximum brake pressure and also no longer regulate with the high dynamics. In this case, the torque of the traction drive TM of the rear axle can be used to produce an additional braking torque, whereby the locking pressure or maximum deceleration can still be achieved despite half the torque of the pressure supply device. The performance is limited, however, so that the individual wheel control has a poorer performance in this case and the braking distance increases, in particular when operating on high coefficients of road friction in ABS operation. In any case, a high level of security and control quality can be achieved that is superior to the current systems of the HAD level.

FIG. 3d shows the fault case F2, in which the pressure supply device of the rear axle HA has completely failed. In this fault case, the brake circuits are connected to one another via the connection module and the pressure supply device DV2 of the front axle takes over the pressure control, preferably in multiplex operation for all wheel brakes RB1-RB4. In this fault case too, the braking force of the traction drives TM can also be used to decelerate the vehicle. As shown in FIG. 3c, this fault case leads to a loss of performance, but not to security risks.

FIG. 3e shows the subsequent delivery of braking medium from the chamber K2 into the pressure supply device DV1, in which the piston KB is adjusted or withdrawn to the right. By closing the switching valves SV1 and SV2 with the separating valve TV2 open, the medium can then be pressed via the connection module from the pressure supply device DV1 into the chamber K1 of the reservoir VB in order to refill it or, alternatively, can be subsequently delivered from this chamber of the reservoir. This results in a further redundancy.

FIG. 4a shows a cross-sectional view through a hydraulically supported electromechanical brake H-EMB, which can be connected to the pressure supply device DV1 via a hydraulic connection HL-DV1, so that a force can be applied to the brake disks either via the hydraulics and/or the electric motor EM. The rotary movement of the electric motor is transferred into a linear movement via a gear G and produces the force $F_{EM}$ on the wheel brake. The transmission G is preferably designed to be self-locking, so that the parking brake functions safely when the vehicle electrical system fails. In addition to the electric motor, a hydraulic force $F_{hyd}$ is produced via the pressure supply. Depending on the embodiment of the EM as a brush motor or a brushless motor with lower or higher power, the dynamics of the braking torque change and the additionally available braking torque can be determined by the H-EMB by appropriate design of the components and matched to the hydraulic brake.

FIG. 4b shows a possible valve circuit and its function for regulating pressure in the four wheel brakes RB1 to RB4 in accordance with the valve circuit of FIG. 3a (AV implemented only on wheel brake RB2, not on RB3). The pressure build-up and pressure reduction in the wheel brakes takes place preferably via the pressure supply device DV1 when the switching valves SV1 and SV2 are open in the wheel brakes RB1 and RB2, and via DV2 when the switching valves SV3 and SV4 are respectively open in the wheel brakes RB3 and RB4. Control is either with pressure as a control variable supported with the PPC method, e.g., by suitable pilot control, or, if a pressure transducer is not available, exclusively by the PPC method, In addition, the pressure of the wheel brake RB2 can be released into the reservoir VB via the outlet valve AV, e.g., by PWM control of the AV valve, in which case AV is open and SV2 is closed. At the same time, pressure can be built up in RB1 via DV1 by opening the switching valve SV1. A combination of the PPC method with PWM control is also a possible control method. In this case, both switching valves SV1 and SV2 are open or one switching valve or both switching valves are clocked using the PWM method and outlet valve AV is either open or is also clocked. This method is an alternative to the known multiplex method, where switching valves are opened or closed digitally and the pressure reduction takes place sequentially or simultaneously and is based on the method in DE 102015103858. The valve circuit can be expanded with further outlet valves (1 AV in each case in RB3 see FIG. 3a, or AV valves on three or all wheel brakes in all wheel brakes), if further degrees of freedom are required when reducing the pressure. The switching valves SV1-4 are arranged and designed in such a way that they open automatically as a result of the pressure trapped in the wheel brakes. This ensures that even if the entire system fails, no brake pressure is trapped in the wheel.

FIG. 4c shows an embodiment of an actuating device BE with brake pedal 1, tappet 2, piston 3, cylinder 5 and pedal feel simulator 6 for building up pressure in one or more brake circuit(s) BK1 or BK2. The piston 3, which has three seals D1, D2, D3 in the cylinder 5, is moved to the left by the brake pedal 1 via the tappet 2, whereby a pressure builds up in the pressure chamber 4 or a pressure volume is delivered via the hydraulic line HL into the brake circuits BK1/BK2. In addition, redundant seals are provided in the cylinder as well as parallel hydraulic lines VLDR, VLVB to the reservoir VB between the seals D1, D2, D3, a hydraulic line $VL_{DR}$ having a throttle DR. The failure of a seal D1-D3 can thus be reliably diagnosed and a reliable actuation system with pedal feel simulator and sealing system with multiple redundancy as well as the possibility of pressure production made available if the electromotive pressure supply device fails.

FIG. 5 shows a possible embodiment of a pressure supply device DV1 with two control and regulating devices DV-ECU1 and DV-ECU2. The pressure supply device has an electric motor M1, the rotor R of which adjusts a spindle SP which is connected to a piston KB. By adjusting the piston KB, a pressure can be built up in the pressure chamber DR, which can be passed into a brake circuit BK via the separating valve TV. The piston is sealed by a plurality of redundant seals in the cylinder, a redundant, diagnosable sealing system being created as with the actuating unit BE. In the pressure supply device, too, a hydraulic line leads to the reservoir between the seals. This means that the pressure supply is still fully operational and redundant even if a seal fails. The pressure chamber DR is connected to the reservoir via a check valve. Thus, the pressure supply can subsequently deliver. Each of the two control and regulating devices DV-ECU1 and DV-ECU2 are connected via 1×3 phase lines with separate winding or phase systems of motor M1, so that if one control and regulating device or winding system fails, motor M1 still has the other winding or phase system and the other control and regulating device can be operated, even if only about half the torque can then be produced by means of the drive M1. One or both control and regulating device(s) has or have sensors for determining the temperature T, the motor current i and the rotor angle α of the electric motor. To achieve a high level of availability, not only are the control and regulating devices DV-ECU redundant, but also power supplies BN1, BN2 and data and control lines DS1 and DS2 are provided twice. The power supplies BN1 and BN2 can, for example, be different voltage levels of a vehicle electrical system or separate vehicle electrical systems.

FIG. 6a shows torque diagrams to show the braking force support by means of hydraulically supported electromechanical brakes H-EMB and traction motor TM. The diagram on the left shows the torque curve $M_{hyd,Dv1}$, which can be achieved solely by means of the pressure supply device DV1. The diagram on the right shows the torque curve as can be achieved by adding the hydraulically supported electromechanical brake H-EMB and a traction motor TM. A maximum torque $M_{max,\,H-EMB}$ of H-EMB or $M_{max,\,TM}$ of the traction motor is available. With the braking torque $M_{max,\,TM}$ additionally produced by the traction motor TM and the braking torque $\Delta M_{H-EMB}$ produced by means of the H-EMB, the locking pressure (horizontal dashed line) is reached earlier by the time period Δt. A significantly larger braking torque can also be produced.

FIG. 6b shows the possibility of downsizing the pressure supply device DV1, provided that the braking effect of the hydraulically supported brake (H-EMB) according to FIG. 4a is included in the pressure control. The pressure supply device DV1 should not be reduced in terms of its maximum pressure that can be built up, but rather in terms of its dynamics, with which the electric motor can be produced more cheaply.

FIG. 6c shows torque diagrams to show the braking force support by means of hydraulically supported electromechanical brake H-EMB and traction motor TM in emergency operation in the event of failure of a winding or phase system 1×3 phases of the drive M1. By eliminating a winding system, the pressure supply DV1 can no longer build up the required pressure build-up up to the blocking pressure and is also no longer dynamic enough. By using the hydraulically supported electromechanical brake H-EMB and the traction motor(s), the required dynamics and the required brake pressure can be built up (right diagram).

FIG. 6d shows torque diagrams to illustrate the braking torque curve $M_{brems}$ during the subsequent delivery of brake fluid. No further brake pressure can be built up by means of the pressure supply device DV1 during the subsequent delivery from the reservoir VB. With the addition of the braking torque $M_{max,\,TM}$ of the traction motor TM and the braking torque $\Delta M_{H-EMB}$ produced by the H-EMB the braking torque $M_{brems}$ can be further increased during the subsequent delivery, whereby the dynamics of the system are greatly improved.

FIG. 6e shows a brake pressure control in the event of a failure of the pressure transducer DG, with a control of the motor torque $M_{Mot}$ and thus the control of the pressure p being carried out by measuring the motor current $i_{phase}$ and evaluating the pressure-volume characteristic. The motor temperature T is also taken into account, since the torque constant is reduced under temperature and thus has an influence on the proportionality factor kt*(1-Br %*ΔT) between motor torque $M_{Mot}$ and motor current $i_{phase}$. This advantageously results in a redundancy of the pressure measurement. This also means that a pressure transducer can be dispensed with. The control is calibrated by the pressure transducer and it is primarily controlled with current, path and pressure volume characteristic.

However, it is also possible that the pressure is set via the motor current of the drive of the pressure supply device, since the torque of the motor and the motor phase current are proportional to one another.

FIG. 7a shows a representation of an entire structural unit consisting of motor 22, pump Z, HCU and ECU, which is able to exercise the pressure control for hydraulic actuators, in particular hydraulic wheel brakes or hydraulic-electromechanical wheel brakes (H-EMB). The main focus here is on the combination of motor and pump. The pump is arranged in the bearing flange 18 or attached to the HCU or ECU in a separate pump housing 40, as shown in the upper half of the figure. In FIG. 7a a version is shown which requires an additional motor bearing 20 in which the shaft 1 is mounted.

As is usual, the motor is composed of a rotor 21, which is connected to the shaft 1 via the driver 10a. The rotor 21 is axially pretensioned by its force via a permanent magnet in the housing 30. This is a solution for the motor manufacturer who manufactures and tests the motor with housing 22 and stator and winding 23 and delivers it to the system supplier. The motor is tested with an auxiliary shaft without a pump. Thereafter, when the shaft is removed, the rotor is centered by the axial magnetic force, so that the shaft 1 can then be assembled with the rotor during final assembly. The drive housing must also be joined and fastened here with the flange 18 at 25a—shown in the lower half of the figure— e.g., with springs, which are attached in segments over three connections. A housing seal 31 is also necessary here. It can be fastened by caulking, at 25 from the engine flange with HCU or ECU, see upper half of the FIG. 28. The pump version with pump housing is shown here. The motor is shown here as a brushless motor that needs a motor sensor for commutation and control of the volume delivery of the pump. This motor sensor is arranged at a distance from the drive housing 22, a sensor shaft 26, which is arranged or attached to the drive shaft 1, carrying a sensor target 27. This target 27 acts on the sensor element 28, which is arranged on the circuit board of the ECU. The winding is connected to the ECU via contact bars 24.

The motor with bearing flange 18 can be connected directly to the hydraulic housing HCU, which includes valves or other hydr. components to be connected to the pump. If this is not the case, a connection of the drive housing 22, 18 directly to the housing of the ECU is possible.

It is also possible to arrange the gear pump Z in a pump housing 40 which is connected directly to the hydraulic housing HCU, as is shown in FIG. 7a in the upper half of the drive shaft 1. Before the assembly of the pump housing 40 and the hydraulic housing HCU or the pump housing 40 and the ECU, the gear pump Z is first integrated or mounted in the pump housing 40, the rotor 21 then being pressed onto the shaft 1 and then assembled with the bearing 20. Here, the tensile force of the magnet 30 can also act on the rotor 21 and the bearing 20, so that the bearing acts like a four-point bearing. The motor housing 22 is thus connected to the gear pump Z and its pump housing 40 and, in the next step, can be connected to the hydraulic housing HCU or the electronics housing ECU. The fastening screw 41 is used for this. The shaft 1 is previously centered in the outer disks 7.1 and 7.2, so that the pump housing 40 is centered with the shaft 1 before the screw connection to the hydraulic housing HCU or the electronics housing ECU.

The pressure supply device according to FIG. 7b uses a 2-stage pump with a long sliding or rolling bearing, which does not require a separate motor bearing. Accordingly, the motor structure with the housing is simplified. The rotor 21 is seated with the driver 10a on the motor shaft and is axially connected to the locking ring. The pump housing protrudes slightly into the HCU here.

The invention claimed is:

1. A braking system for a vehicle having at least two axles and hydraulically acting wheel brakes associated with wheels of the vehicle, including:
    at least two hydraulic brake circuits, each having at least one of the hydraulically acting wheel brakes,
    at least two pressure supply devices, driven by an electric-motor drive,
    at least one valve assembly having valves for the wheel-specific adjustment of brake pressures and/or for disconnecting or separating the wheel brakes from a pressure supply device of the at least two pressure supply devices,
    at least two electronic control and regulating units, one of which being a superordinate central control unit that controls individual control and regulating units of components of the braking system, wherein the superordinate central control unit also controls an electric power steering system, and
    at least one additional electric drive motor provided for at least one of the axles or at least one wheel, wherein the at least one additional electric drive motor is used to drive and decelerate the at least one axle or the at least one wheel,
    wherein during a steering intervention, the superordinate central control unit is configured to control the electric power steering system and, simultaneously, at least one of the pressure supply devices to control the pressure in at least one wheel brake or the at least one electric drive motor, and
    wherein when braking, different braking torques are produced on the axles for braking force distribution and/or on the wheels of an axle for producing a yaw moment or steering intervention using the wheel brakes and/or the drive motors, and
    wherein the braking system further comprises an electronic brake pedal connected to the superordinate central control unit and/or to the at least one pressure supply device via an electrical connection, only.

2. The braking system according to claim 1, wherein
    at least one of the pressure supply devices has two electronic control and regulating units, which are independent of one another, or a double-redundant control and regulating unit for controlling the electric-motor drive of the at least one of the pressure supply devices, and/or
    each of the at least two pressure supply devices is assigned to one of the brake circuits to control operation of the braking system, and a connection module is provided to enable connecting the brake circuits in such a way that in an event of a failure of one of the pressure supply devices, pressure supply or pressure control for both brake circuits is performed by the other, still functioning, one of the pressure supply devices.

3. The braking system according to claim 2, characterized in that at least one of the electronic control and regulating units is arranged to control separate windings of the or an electric-motor drive.

4. The braking system according to claim 1, further including an actuating device arranged to detect a vehicle driver's command, wherein the actuating device forms a separate assembly that is attached to a bulkhead of the vehicle.

5. The braking system according to claim 1, wherein at least one wheel brake is a hydraulically supported electromechanical brake, an electric parking brake, or an electromechanical brake, or wherein, in addition to a wheel brake, an additional parking brake or electromechanical brake has a braking effect on at least one of the wheels.

6. The braking system according to claim 1, wherein the at least one electric drive motor is arranged to be used for recuperation when braking, and wherein a plurality of drive motors for at least one axle or one drive motor is or are provided on at least one axle of the vehicle and is/are arranged to brake an axle or at least one of the wheels.

7. The braking system according to claim 1, wherein the superordinate control unit is arranged to determine a braking torque to be produced by means of the wheel brakes during braking, and the electronic control and regulating unit is arranged to control the pressure supply devices accordingly and/or to control or to use the at least one electric drive motor to build up a braking torque produced in addition to brake torque produced by the wheel brakes.

8. The braking system according to claim 1, wherein the superordinate control unit is arranged to control the at least two pressure supply devices, valves, electric drive motors and/or an electric parking brake or hydraulically supported brake during the braking process and/or anti-lock braking system (ABS) control operation and/or to perform diagnosis of the braking system.

9. The braking system according to claim 1, characterized in that at least one electronic control and regulating unit of the at least one pressure supply device and a valve assembly have a separate power supply and signal transmission.

10. The braking system according to claim 9, wherein all electronic control and regulating units are supplied by at least two vehicle electrical systems and/or have redundant signal transmissions to the superordinate central control unit.

11. The braking system according to claim 1, wherein a combined use of pressure supply devices, hydraulically supported electromechanical brake(s), electric parking brake(s) and/or electromechanical brake(s) and/or drive motor(s) is used to control operation to increase speed of brake force build-up and decrease time to build up locking pressure in comparison to speed of brake force build-up and time to build up locking pressure in a case in which combined use of pressure supply devices, hydraulic supported electromechanical brake(s) and/or drive motor(s) is not used to control operation, or if one or more components of the braking system fails.

12. The braking system according to claim 1, wherein at least one pressure supply device comprises a rotary pump, wherein the rotary pump is able to perform controlled volume control for both pressure build-up and pressure reduction.

13. The braking system according to claim 1, wherein the superordinate central control unit of the braking system also controls an electric power steering system.

14. The braking system according to claim 1, further including at least one hydraulically supported electromechanical brake that is enabled to be connected to a pressure supply device of the at least two pressure supply devices via a hydraulic line, wherein a hydraulic force is enabled to be produced by pressure build-up or pressure reduction by the pressure supply device, wherein an electric motor and a non-hydraulic transmission device are arranged to additionally produce a force on a respective one of the wheel brakes and both forces act simultaneously or independently of one another on a brake disk of the wheel brake.

15. A vehicle dynamics system including:
the braking system according to claim 1,
wherein the vehicle dynamics system is arranged to control the vehicle's dynamic control functions with its superordinate central control unit using the braking system, the electric drive motors and the electric power steering system, as well as at least one hydraulically supported brake and/or at least one electric parking brake.

16. The vehicle dynamics system according to claim 15, wherein the vehicle dynamics control functions include one or more of the following: an electrical brake booster, ABS operation, stability control, recuperation and steering interventions.

17. A vehicle including the braking system according to claim 1.

18. A method of operating the braking system according to claim 1, the method including:
performing axle-wise deceleration using at least one of the at least two pressure supply devices, and simultaneously using the at least one electric drive motor, wherein recuperation and brake force distribution are realized simultaneously.

19. The method according to claim 18, further including:
producing braking torques on the wheels individually by means of the at least two pressure supply devices and/or the at least one electric drive motor to result in either:
providing yaw moments for steering interventions to support an electric steering system of the vehicle or in an emergency in the event of failure of the electric steering system to ensure that the vehicle can be steered, or
producing yaw moments for steering interventions in order to steer a vehicle without electric power steering.

20. The braking system according to claim 1, wherein at least one of the pressure supply devices is controlled by the superordinate central control unit, only.

21. A braking system for a vehicle having at least two axles and hydraulically acting wheel brakes associated with wheels of the vehicle, including:
at least two hydraulic brake circuits, each having at least one of the hydraulically acting wheel brakes,
at least two pressure supply devices, driven by an electric-motor drive,
at least one valve assembly having valves for the wheel-specific adjustment of brake pressures and/or for disconnecting or separating the wheel brakes from a pressure supply device of the at least two pressure supply devices,
at least two electronic control and regulating units, one of which being a superordinate central control unit that controls individual control and regulating units of components of the braking system, and
at least one additional electric drive motor provided for at least one of the axles or at least one wheel, wherein the at least one additional electric drive motor is used to drive and decelerate the at least one axle or the at least one wheel,
wherein during a steering intervention, the superordinate central control unit is configured to simultaneously control an electric power steering system and the at least one electric drive motor, and to also simultaneously control at least one of the pressure supply devices to control the pressure in at least one wheel brake, and
wherein when braking, different braking torques are produced on the axles for braking force distribution and/or on the wheels of an axle for producing a yaw moment or steering intervention using the wheel brakes and/or the at least one electric drive motor;
wherein the at least one of the pressure supply devices is controlled by the superordinate central control unit, only.

* * * * *